United States Patent
Owens et al.

(10) Patent No.: US 12,483,756 B2
(45) Date of Patent: Nov. 25, 2025

(54) SYNCHRONIZING INFORMATION ACROSS APPLICATIONS FOR RECOMMENDING RELATED CONTENT

(71) Applicant: Apple Inc., Cupertino, CA (US)

(72) Inventors: Michael J. Owens, Rancho Mission Viejo, CA (US); Neil C. Wright, San Jose, CA (US); Joseph LaBarck, New York, NY (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/329,494

(22) Filed: Jun. 5, 2023

(65) Prior Publication Data

US 2023/0396849 A1 Dec. 7, 2023

Related U.S. Application Data

(60) Provisional application No. 63/365,874, filed on Jun. 5, 2022.

(51) Int. Cl.
*H04N 21/466* (2011.01)
*H04N 21/45* (2011.01)

(52) U.S. Cl.
CPC ..... *H04N 21/4668* (2013.01); *H04N 21/4524* (2013.01)

(58) Field of Classification Search
CPC ........... H04N 21/4668; H04N 21/4524; H04N 21/44204; H04N 21/4532; H04N 21/4788
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,348,458 B2 | 5/2016 | Hotelling et al. |

(Continued)

FOREIGN PATENT DOCUMENTS

| | | |
|---|---|---|
| AU | 2018100810 A4 | 7/2018 |
| WO | 2013169849 A2 | 11/2013 |

(Continued)

OTHER PUBLICATIONS

International Search Report received for PCT Patent Application No. PCT/US2023/024490, mailed on Aug. 18, 2023, 4 pages.

*Primary Examiner* — Anthony Bantamoi
(74) *Attorney, Agent, or Firm* — Kubota & Basol LLP

(57) ABSTRACT

In some embodiments, a first user interface of a first application is displayed by an electronic device which includes a first recommended content based on input for interaction with first content in a second application, different from the first application.

54 Claims, 16 Drawing Sheets

(56) References Cited

U.S. PATENT DOCUMENTS

| | | | |
|---|---|---|---|
| 9,933,937 B2 | 4/2018 | Lemay et al. | |
| 11,558,672 B1* | 1/2023 | Clasen | H04N 21/61 |
| 2002/0015024 A1 | 2/2002 | Westerman et al. | |
| 2004/0268403 A1* | 12/2004 | Krieger | H04N 7/173 |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2013/0166580 A1* | 6/2013 | Maharajh | G06F 17/30 |
| 2015/0365787 A1* | 12/2015 | Farrell | H04L 29/06 |
| 2019/0342616 A1 | 11/2019 | Domm et al. | |
| 2021/0289262 A1* | 9/2021 | O' Connor | H04N 21/4668 |

FOREIGN PATENT DOCUMENTS

| | | |
|---|---|---|
| WO | 2014105276 A1 | 7/2014 |
| WO | 2021096957 A1 | 5/2021 |

* cited by examiner

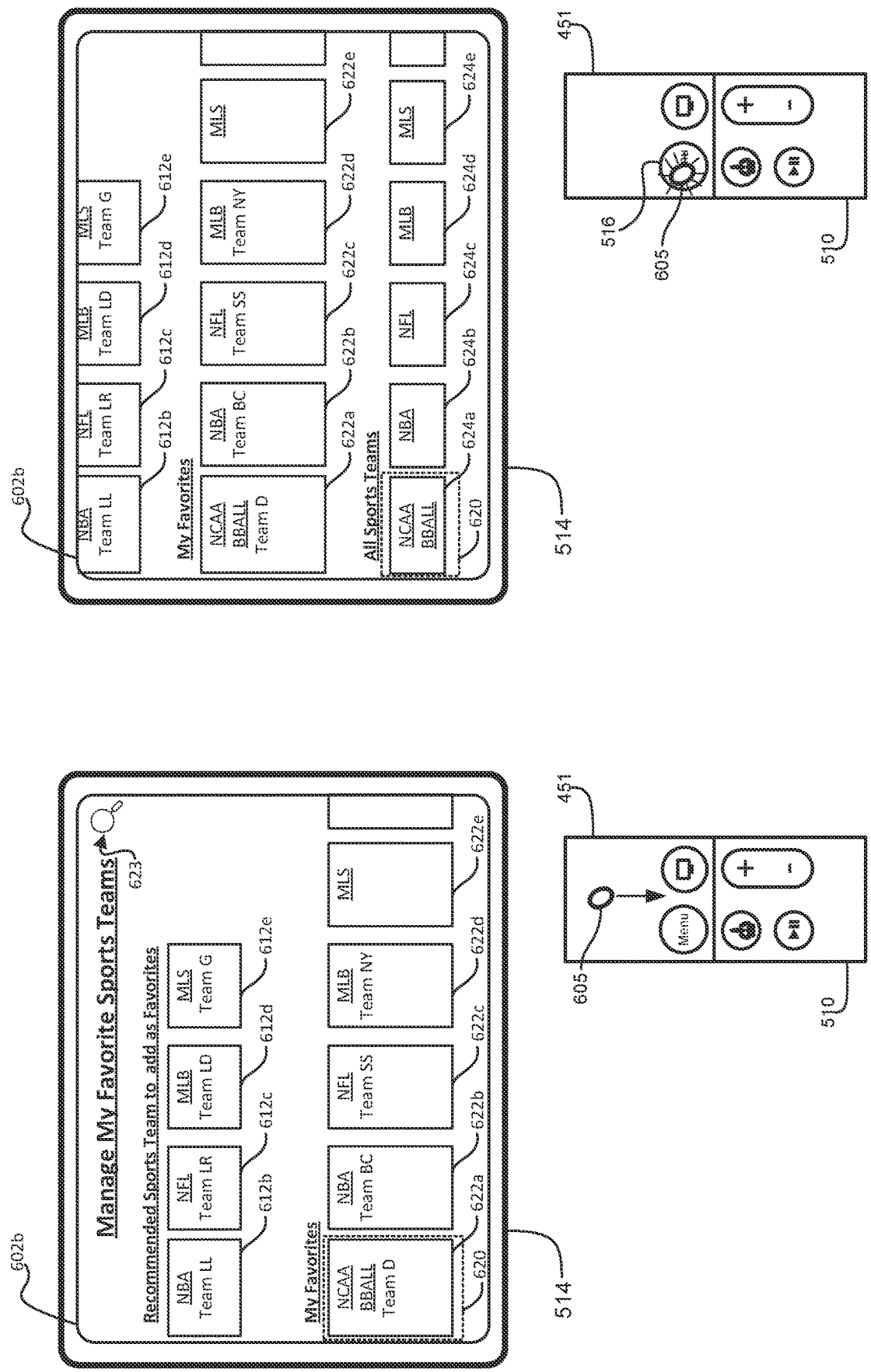

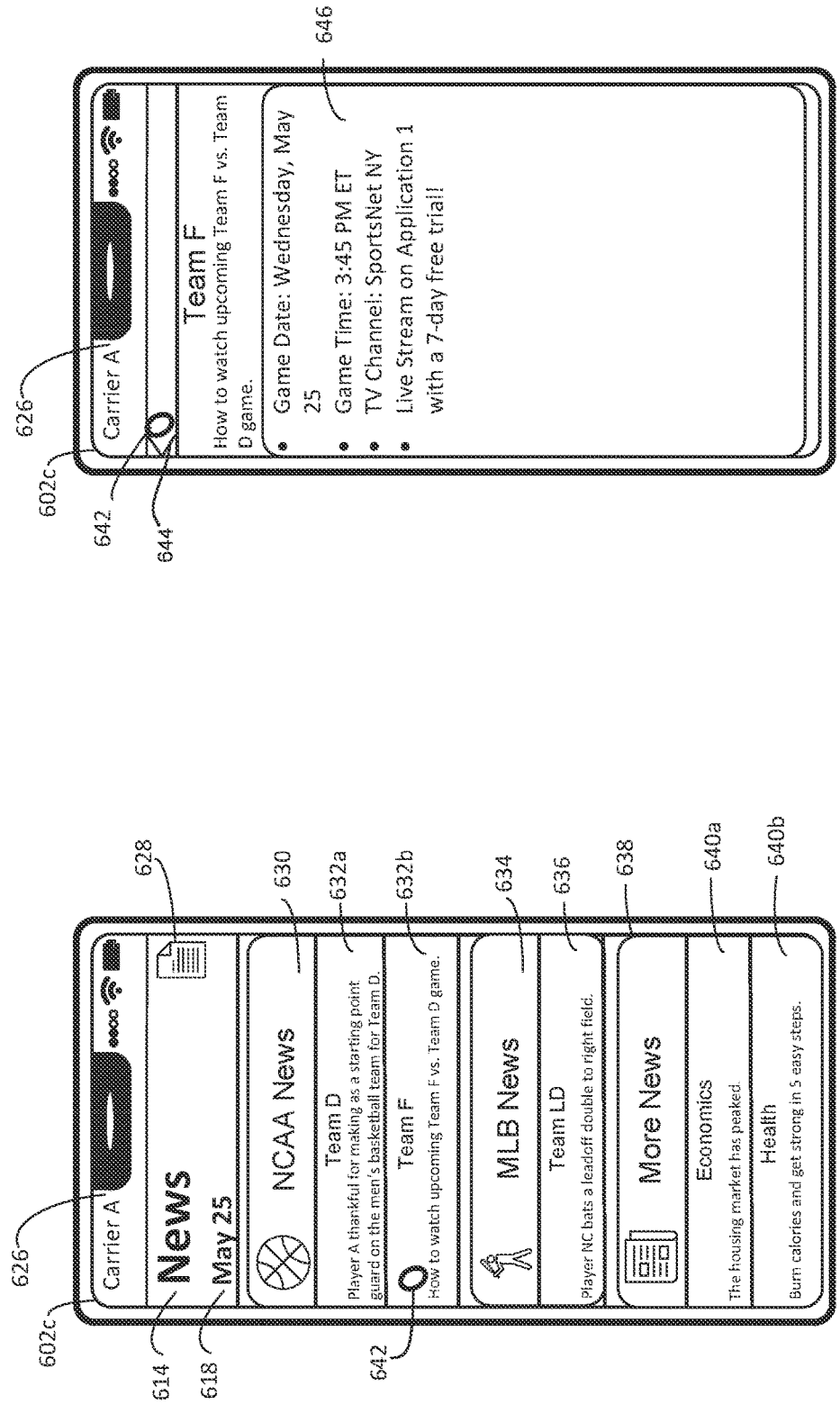

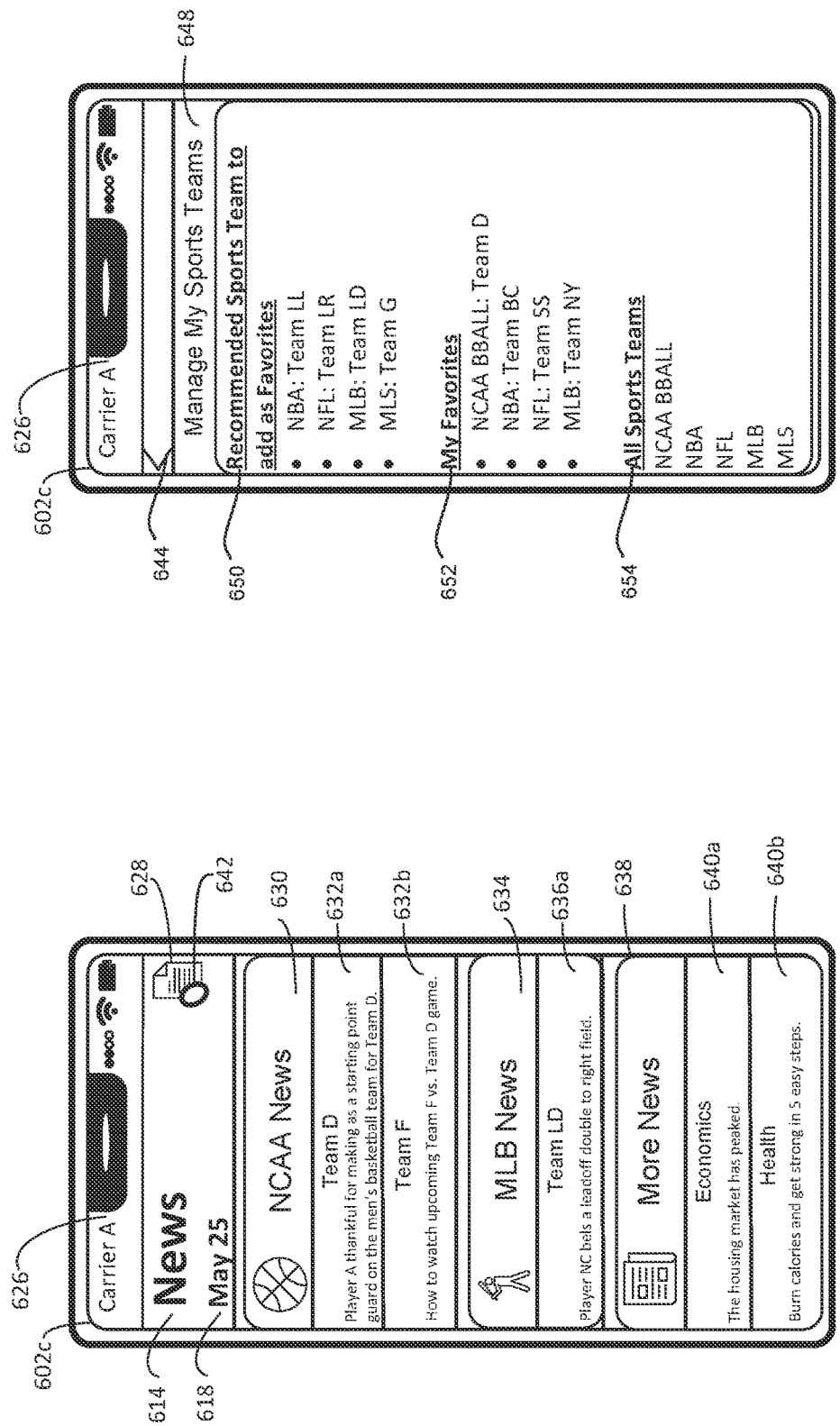

SYNCHRONIZING INFORMATION ACROSS APPLICATIONS FOR RECOMMENDING RELATED CONTENT

CROSS-REFERENCE TO RELATED APPLICATIONS

This application claims the benefit of U.S. Provisional Application No. 63/365,874, filed Jun. 5, 2022, the content of which is incorporated herein by reference in its entirety for all purposes.

FIELD OF THE DISCLOSURE

This disclosure relates generally to an electronic device synchronizing information about content across different applications to recommend related content to a user of the electronic device.

BACKGROUND OF THE DISCLOSURE

User interaction with electronic devices has increased significantly in recent years. These devices can be devices such as computers, tablet computers, televisions, multimedia devices, or mobile devices. While interacting with content in an application of an electronic device, the user may wish to be presented with recommended contents that the user is interested in. The user may therefore desire efficient ways in which the electronic device presents the user with recommended content based on their activity across different applications.

SUMMARY OF THE DISCLOSURE

In some circumstances, an electronic device (e.g., a set top box) can display one or more user interfaces that are configured to present recommended content in a first application based on a user's activity across different applications. Providing efficient ways of presenting content to a user via an application of an electronic device may improve the user's experience with the electronic device and reduce the number of inputs needed to sort through and identify content that the user may have an interest in, thereby reducing power usage and improving the battery life of the electronic device.

Some embodiments described in this disclosure are directed to ways in which an electronic device synchronizes information about content across different applications to recommend related content to a user. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 6A-6L illustrate exemplary electronic devices that synchronize information about content across different applications to recommend related content to a user in accordance with some embodiments of the disclosure.

DETAILED DESCRIPTION

Figure 1A:
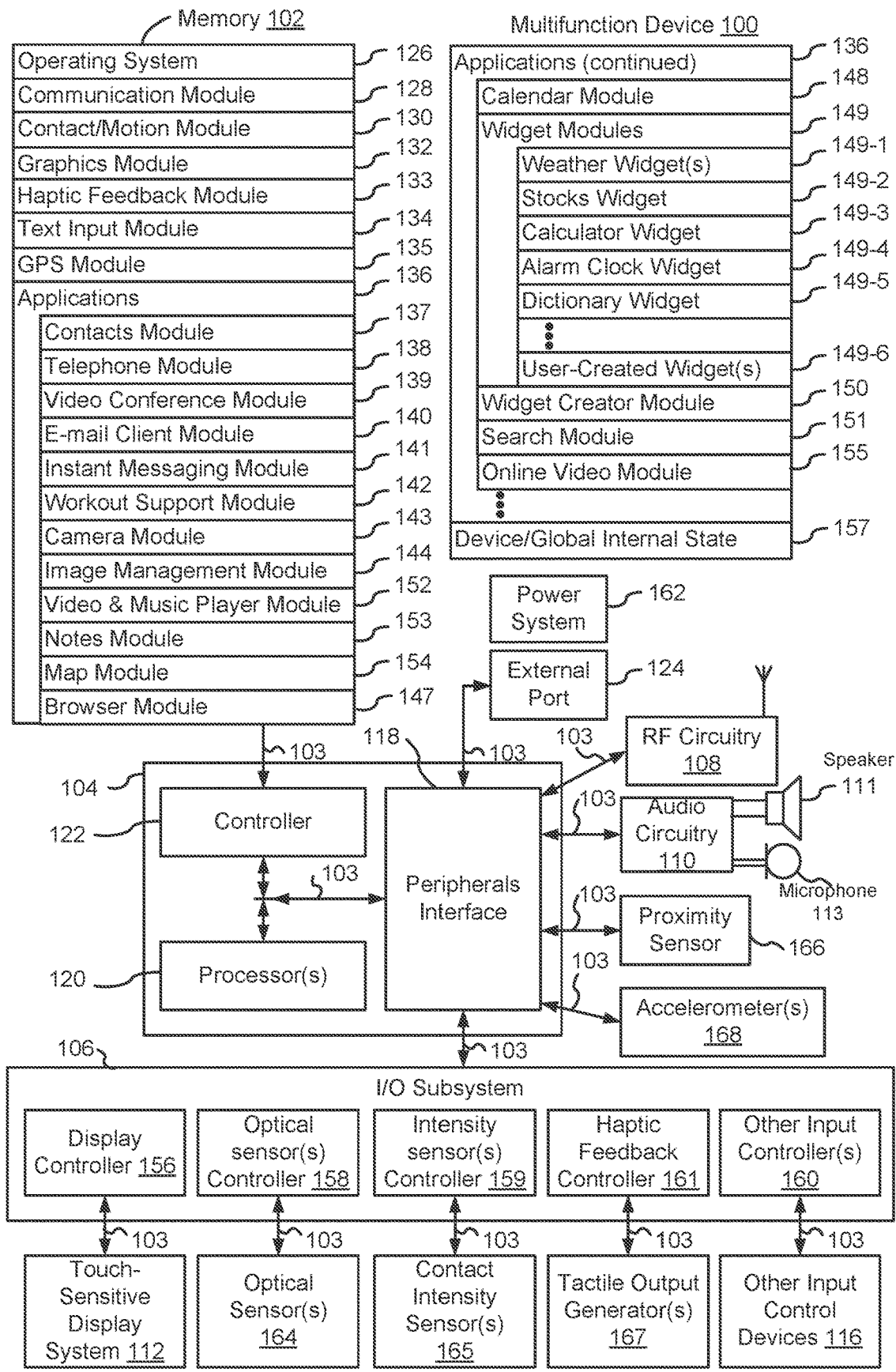
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

There is a need for user interfaces of an application that can present recommended content items that are of interest to a user based on the user's activity across different applications. In some implementations, a first user interface of a first application is displayed by an electronic device which includes a first recommended content based on input for interaction with content in a second application, different from the first application. Further, such techniques present content that the user may be interested in viewing easily accessible, thus reducing the number of inputs needed to sort through and identify content that the user may have an interest in, thereby reducing power usage and improving the battery life of the electronic device Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
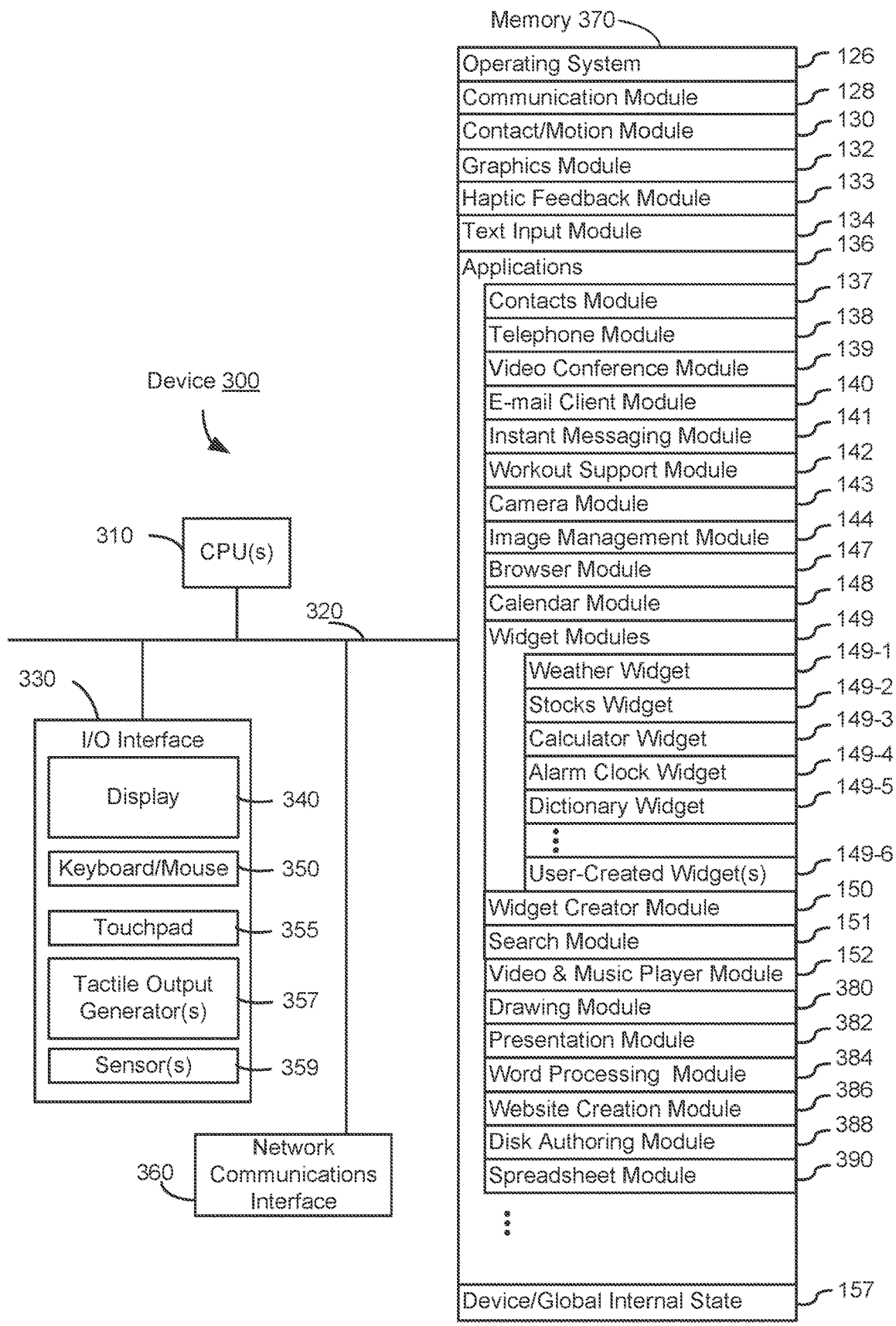
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module;
  music player module;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module and music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
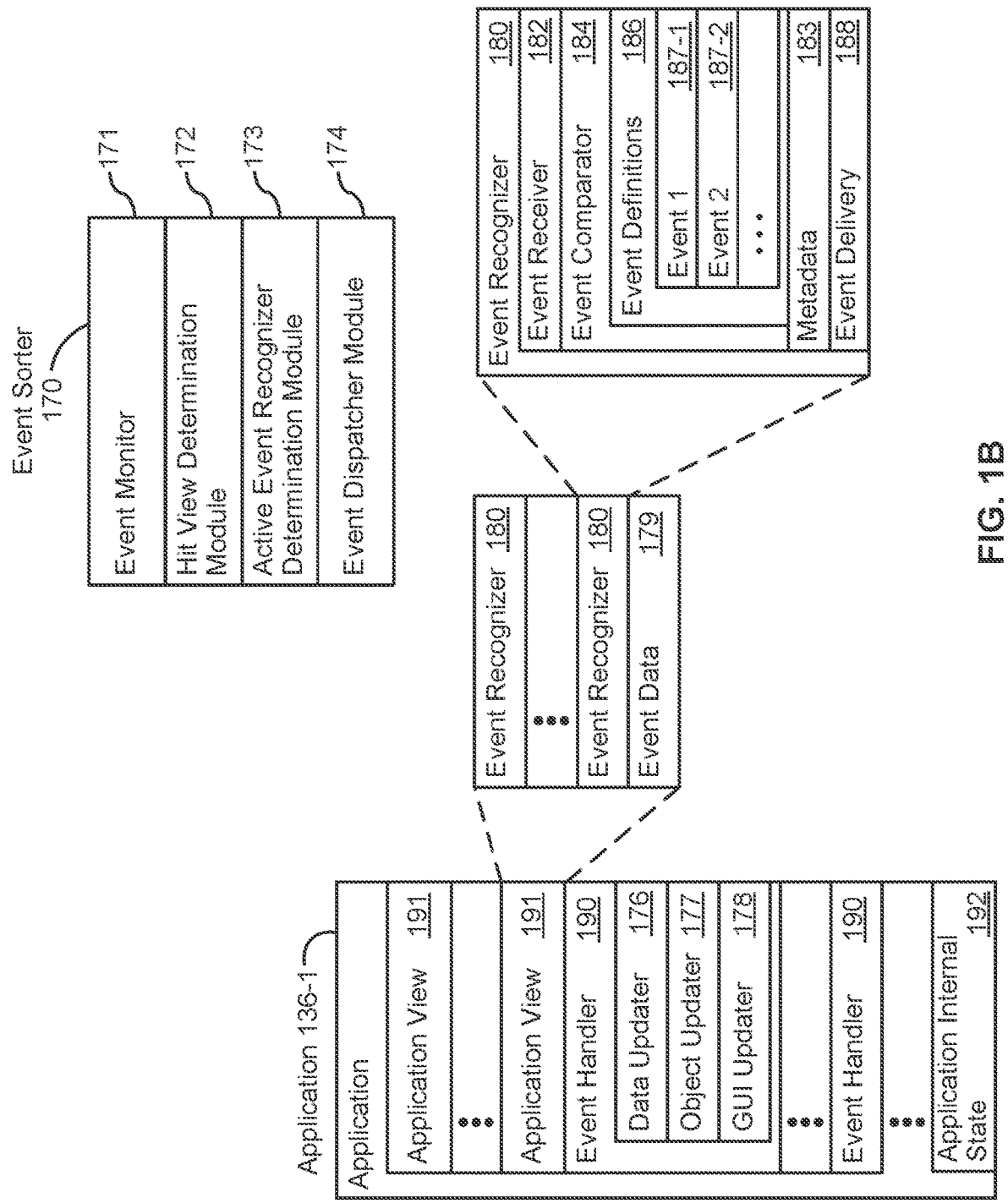
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
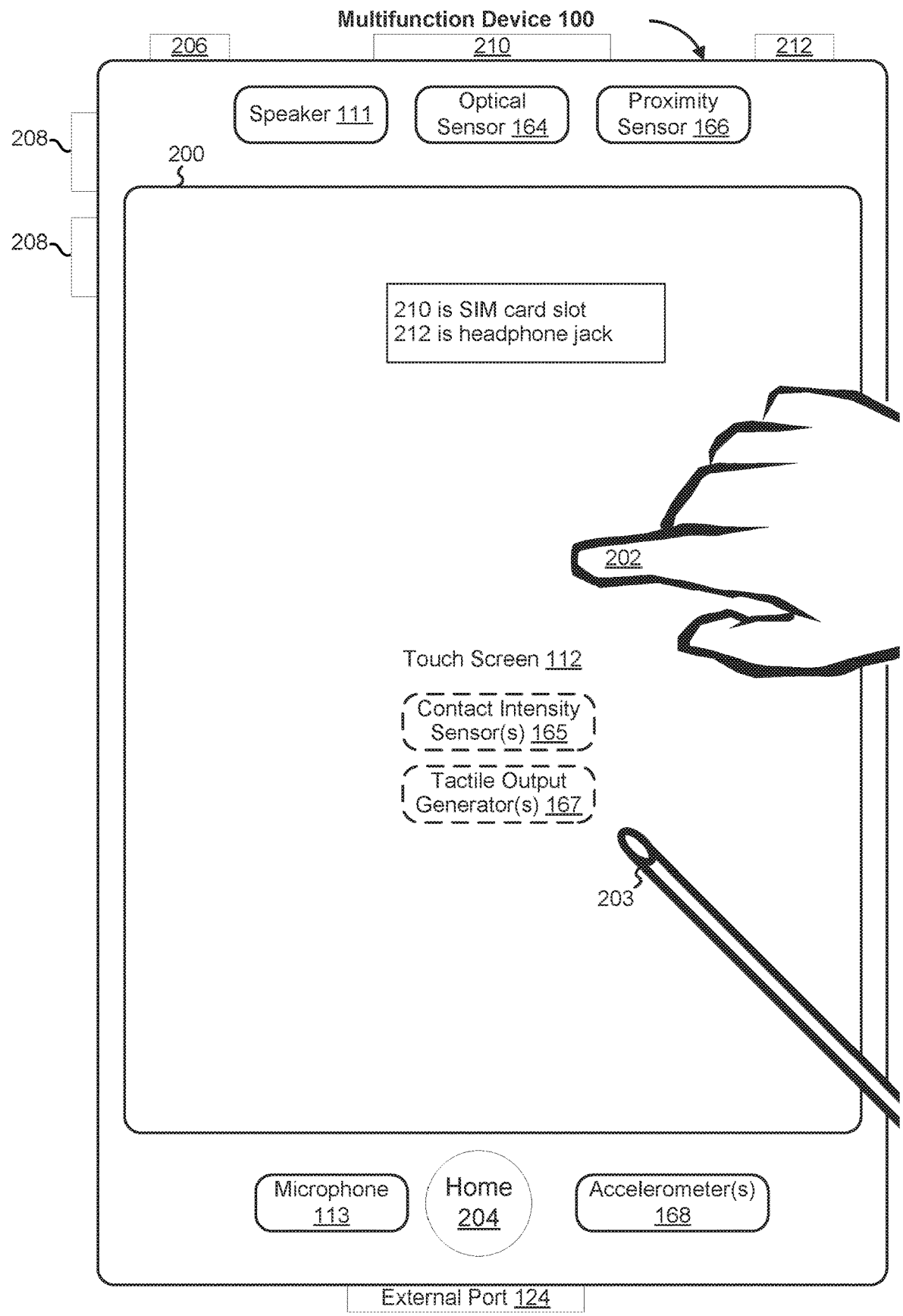
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
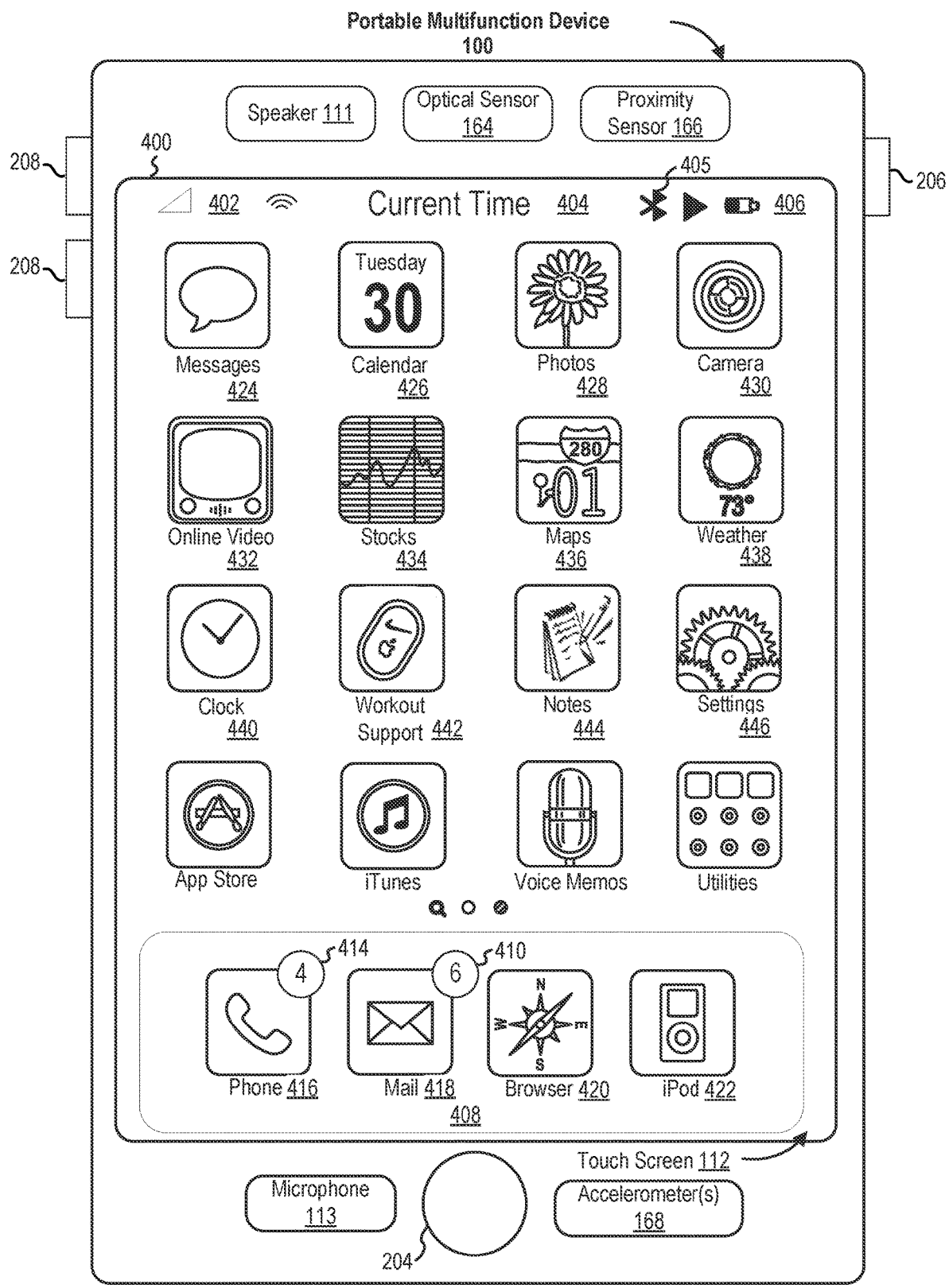
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and Icon 422 for video and music player module 152, also referred to as iPod (trademark of Apple Inc.) module 152, labeled "iPod;" and Icons for other applications, such as:

Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
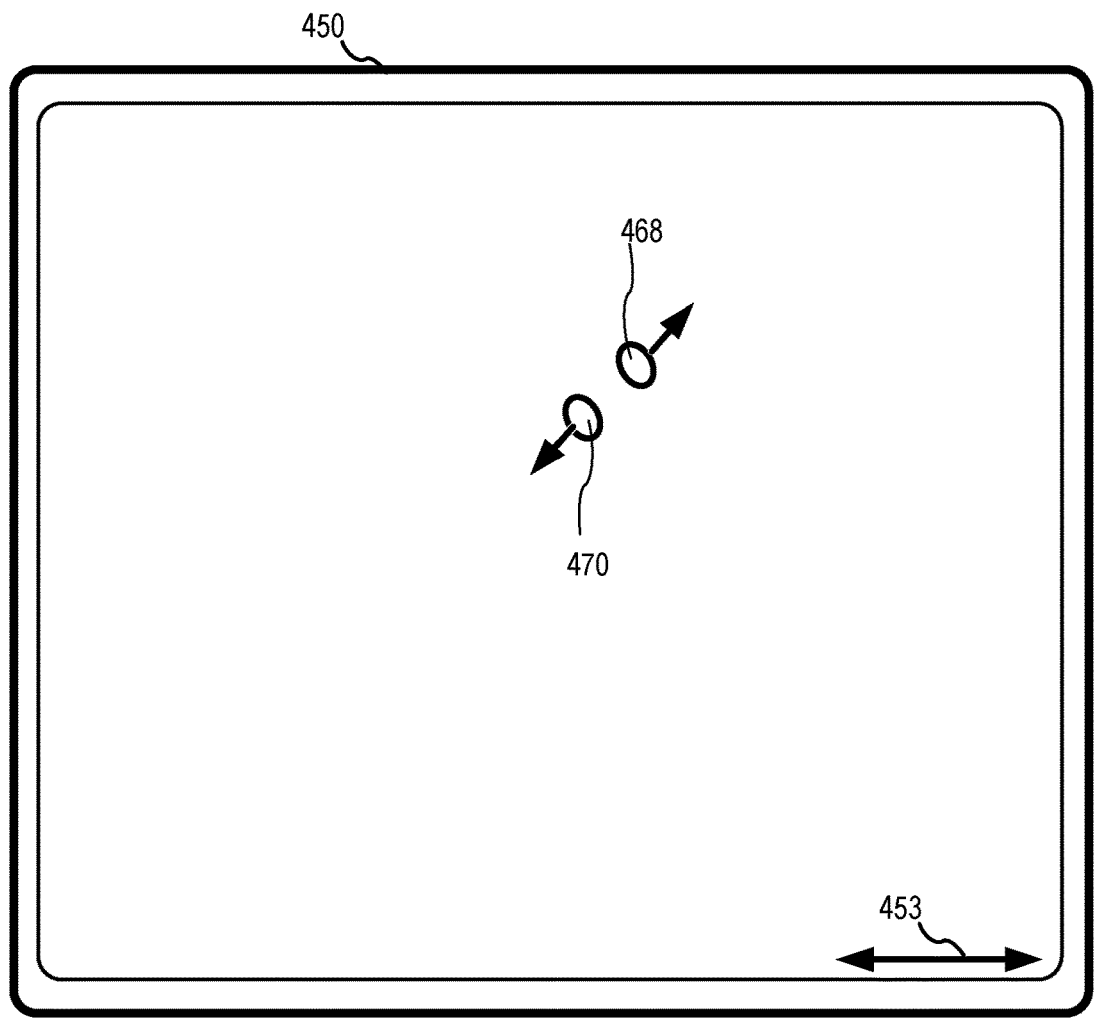
FIG. 4B illustrates an exemplary user interface for a multifunction device with a touch-sensitive surface that is separate from the display in accordance with some embodiments.
Figure 4B:
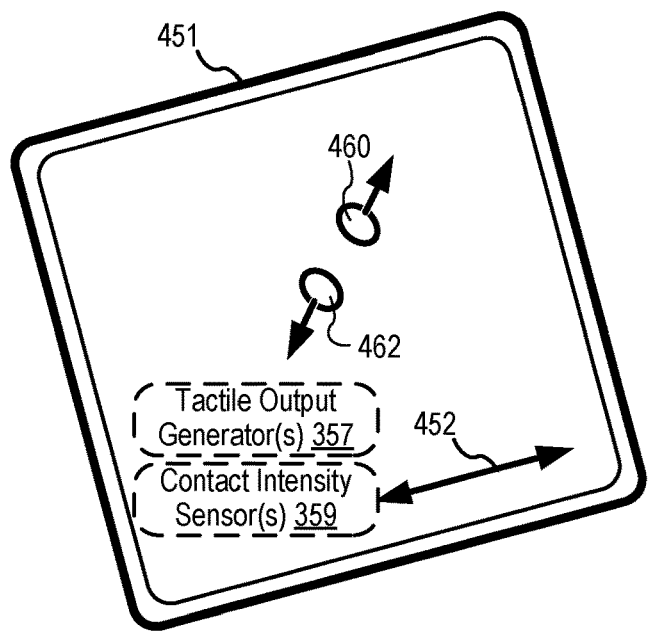

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
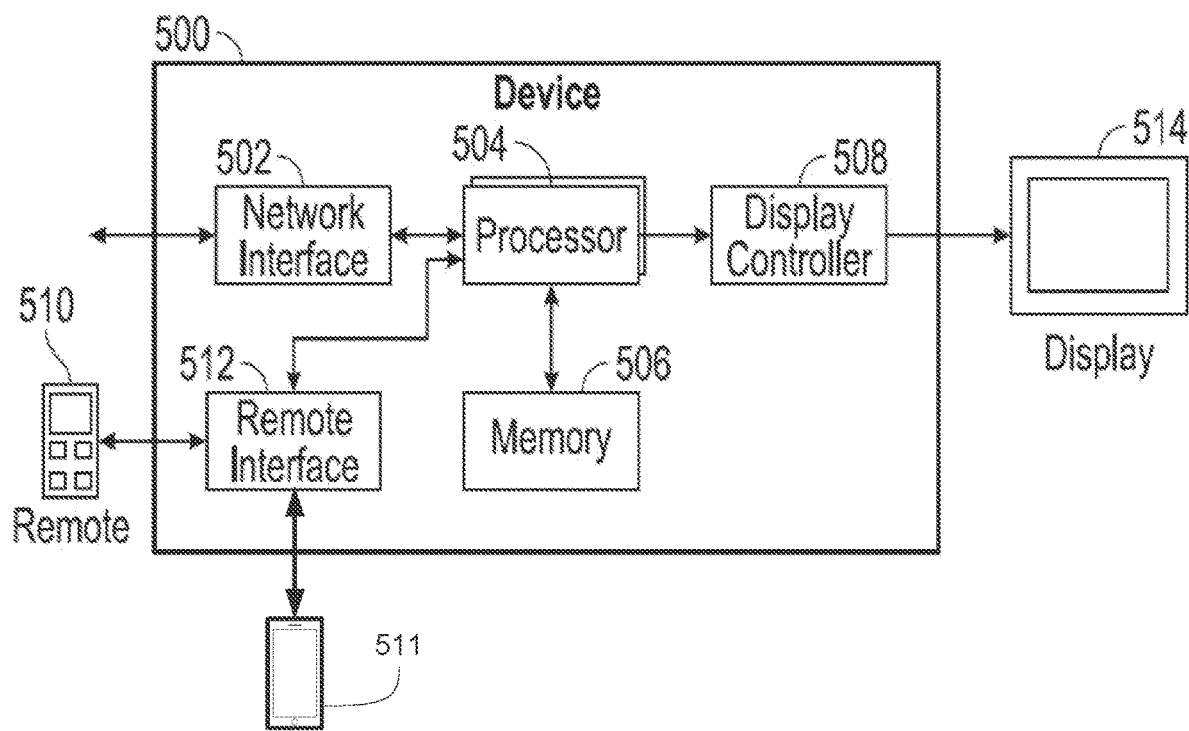
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIGS. 5, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4B; and, display 514 optionally corresponds to one or more of touch-sensitive display system 112 in FIGS. 1A and 2, and display 340 in FIG. 3.

Figure 5B:
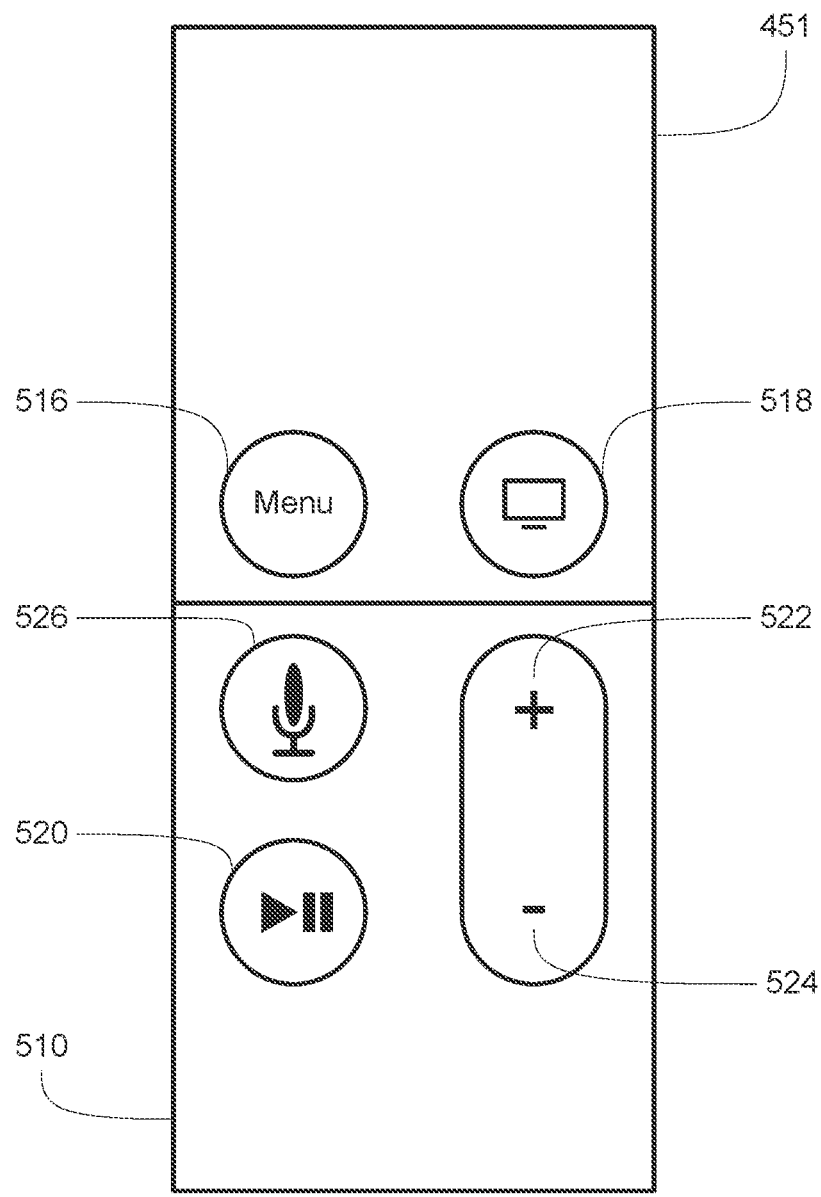

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
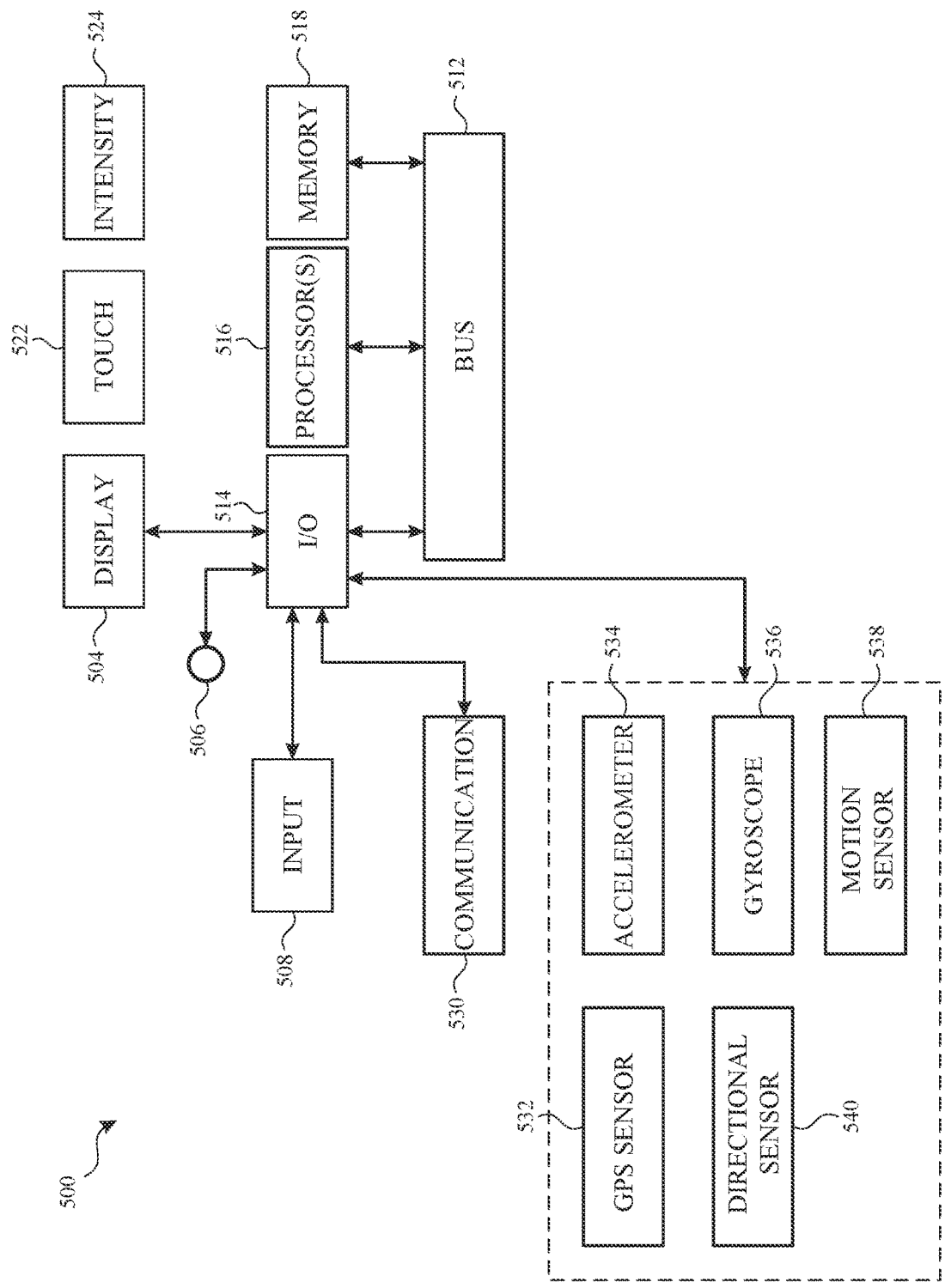

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-11. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. but can include other or additional components in multiple configurations.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application" (U.S Provisional Patent Application No. 62/822,952), , filed Mar. 24, 2019), "User Interfaces For a Media Browsing Application" (U.S. Provisional Patent Application No. 62/822,948), filed Mar. 24, 2019), and "User Interface Specific to Respective Content Items" (U.S. Provisional Patent Application No. 62/822,966), filed Mar. 24, 2019), each of which is hereby incorporated by reference.

Attention is now directed towards embodiments of user interfaces ("UP") and associated processes that are implemented on an electronic device, such as portable multifunction device 100, device 300, or device 500.

User Interfaces and Associated Processes

Recommending Related Content to a User of a Device

Users may wish to be presented with recommended content that the user is interested in. In some circumstances, users interact with content across different applications. Synchronizing information about content across different applications and recommending content in a user interface of an application based on their activity across different applications allows the user to more efficiently sort through and identify content that the user may have an interest in. Providing efficient ways of presenting content to a user via an application of an electronic device may improve the user's experience with the electronic device and reduce the number of inputs needed to sort through and identify content that the user may have an interest in, thereby reducing power usage and improving the battery life of the electronic device.

FIGS. 6A-6L illustrate exemplary ways in which an electronic device synchronizes information about content across different applications to recommend related content to a user in accordance with some embodiments of the disclosure. The embodiments in these figures are used to illustrate the processes described below, including the processes described with reference to FIG. 7. Although FIGS. 6A-6L illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6L.

FIGS. 6A-6L illustrate exemplary ways in which an electronic device synchronizes information about content across different applications to recommend related content to a user in accordance with some embodiments of the disclosure. The embodiments in these figures are used to illustrate the processes described below, including the processes described with reference to FIG. 7.

Figures 6A, 6B:
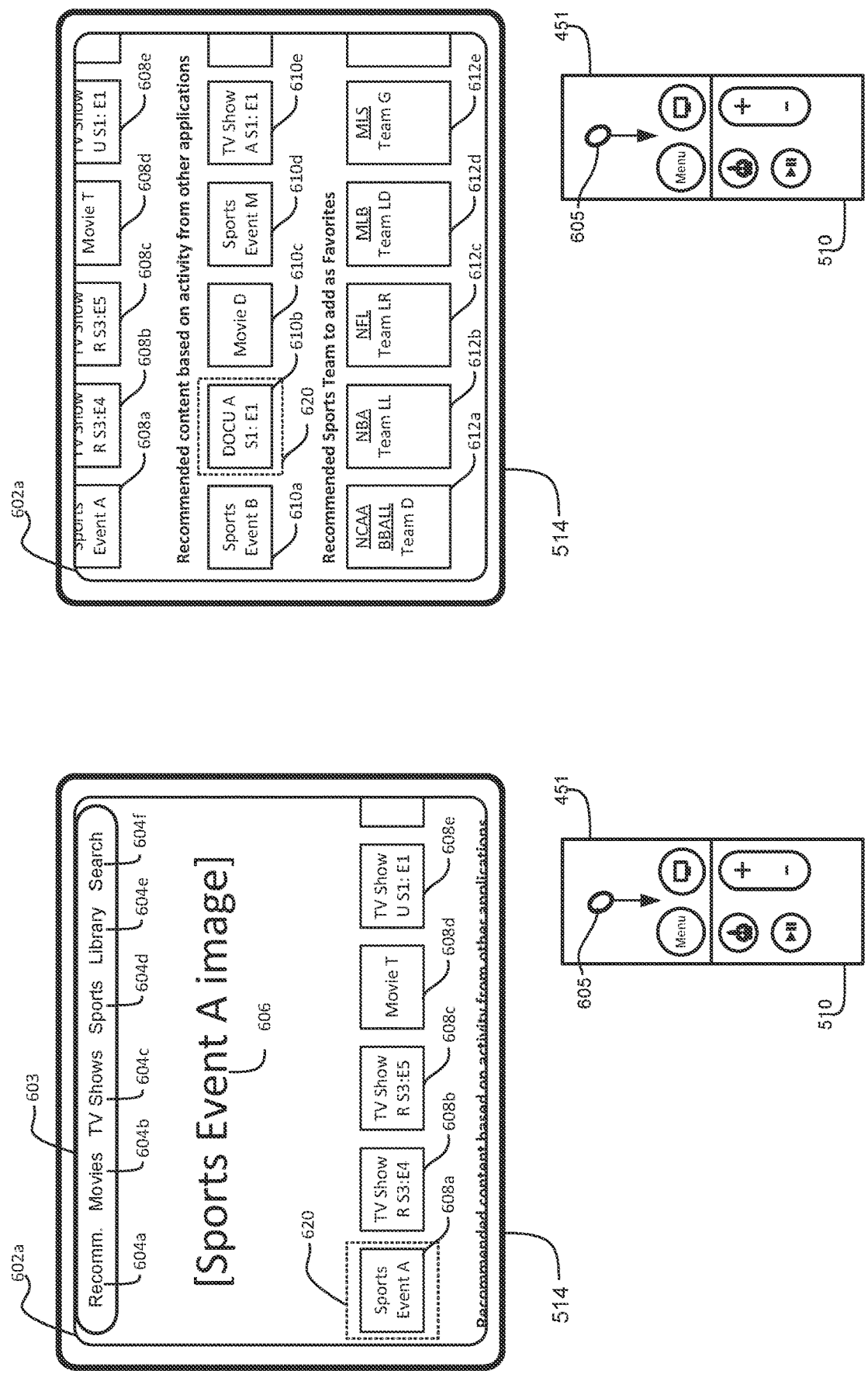

FIG. 6A illustrates a media browsing application user interface 602a displayed on display 514 by an electronic device (e.g., device 500). In the example illustrated in FIG. 6A, display 514 displays a first application (e.g., video content browsing and playback application) running on the electronic device of which display 514 is a part, or to which display 514 is connected. The electronic device optionally has access to various content items (e.g., video content, text-based content, and/or music content) via various applications installed on the electronic device, which provide the electronic device with access to content items from corresponding applications (e.g., a first application corresponding to video content browsing and playback application with access to video content, and/or a second application corresponding to a text-based content browsing and display application with access to text-based content). A plurality of representations of content items representing recommended content items are presented by the electronic device in user interface 602a of the application for various reasons. In some embodiments, the recommended content items are identified as being of potential interest to the user based on various factor such as topics designated as interest to a user, sports teams designated as a favorite sports team, and/or user interaction with a particular type of topics (e.g., scientists, athletes, and/or romance movies). In this way, recommending content items based on the activity of the user in the first application and/or across various applications makes the recommended content that the user may be interested in viewing easily accessible, thereby reducing power usage and improving the battery life of the electronic device.

As shown in FIG. 6A, media browsing application user interface 602a of a first application includes a navigation bar 603 including a plurality of navigation tabs 604a (e.g., "Recommendations"), 604b ("Movies"), 604c ("TV Shows"), 604d ("Sports"), 604e ("Library"), and 604f ("Search"). The media browsing application user interface 602a further includes a plurality of representation of content items 608a-608e that, when selected, cause the electronic device to present (e.g., display via display 514) the selected content. As shown, representation of content item 608a (e.g., "Sports Event A"), representation of content item 608b (e.g., "TV Show R S3:E4"), representation of content item 608c (e.g., "TV Show R S3:E5"), representation of content item 608d (e.g., "Movie T"), and representation of content item 608e (e.g., "TV Show U S1:E1") can be selected to launch a respective content item for display by the electronic device.

In some embodiments, the plurality of representations of content items 608a-608e includes recommended video content such as live sports events, movies, music videos and/or TV shows. In some embodiments, the plurality of representations of content items 608a-608e includes text-based content such as news articles, books, and/or magazines. As illustrated, current focus indicator 620 is on representation of content item 608a (indicated by the dashed-line box within Sports Event A), indicating that representation 608a has the current focus such that in response to detecting a selection input at remote 510, representation 608a will be selected. When the electronic device detects that the current focus indicator 620 is located at a specific representation of content item, a preview image 606 that includes a representative image of the content item is displayed in the background of the media browsing application user interface 602a. In some embodiments, the preview image 606 is optionally a still image (e.g., pre-selected cover art associated with Sports Event A or a still image from the current play position in Sports Event A), and/or a video that corresponds to Sports Event A. As different representations of content items in the media browsing application user interface 602a get the current focus indicator 620, the preview image 606 optionally changes accordingly based on the respective content item. Moving the current focus indicator 620 within the media browsing application user interface 602a (e.g., from one representation of content item 608 to another) is optionally accomplished via directional inputs detected on a remote control device 510, such as swipes detected on a touch-sensitive surface 451 of the remote control device 510.

In some embodiments, one or more of the plurality of representations of recommended content items 608a-608e selected for inclusion in the media browsing application user interface 602a is based on input for interaction with content items in the first application and/or across different applications or different types of applications on the electronic device. For example, the electronic device in FIG. 6A has received an input request to launch a first application (e.g., the video content browsing and playback application). Using prior user input data and/or current input data from the first application and/or a second application (e.g., a text-based content application indicating a sports article related to team D was consumed), the electronic device processes the prior user input data to recommend one or more of the plurality of representation of content items 608a-608e, such as described in more detail with reference to method 700. In particular, because the prior user input data indicates that a sports article related to team D was consumed in a second application (as opposed to the first application), at least one or more of the plurality of representation of content items 608a-608e includes content items related to team D. For example, referring to FIG. 6A, media browsing application user interface 602a includes representation of content item 608a (e.g., "Sports Event A"), which includes team D participating in Sports Event A, because the electronic device detects input data indicating that an article related to team D was consumed previously by the user in the second application. In another example, representation of content item 608e (e.g., "TV Show U S1:E1"), which is a TV show about a player athlete who plays on team D, is included in the media browsing application user interface 602a for similar reasons. In some embodiments, one or more of the representations of content items 608a-608e are not based on user interaction with and/or consumption of content in the second application; for example, in some embodiments, at least some of the recommended content items are recommended as a result of interaction with content in the first application and/or with those recommended content items in particular (e.g., the user has partially watched the content item, the user has purchased the content item, the user has watched, in the first application, a prior episode of a television series and the recommended content item is the next episode in the television series, and the like). As such, one or more of the representations of content items 608b-608 represent recommended content items that are based on the user's input for interaction with content items in the first application and/or a different application. And in some embodiments, the content items recommended in the first application based on content interaction in the second application are included in collections of recommended content that also include recommended content that are not selected based on content interaction in the second application.

In some embodiments, the plurality of representation of content items 608a-608e are of a different form or type consumed by the user in the first application and/or the second application. For example, if the user consumed a text-based content item such as news articles, books, and/or magazines in the first application and/or the second application, at least one of the content items 608a-608e recommended is optionally a content item of a different form or type (e.g., songs, podcast, audiobook, and/or video content such as a movie, a television show, music video, or a documentary).

As further shown in FIG. 6A, the electronic device detects an input to scroll in a downward direction in the media browsing application user interface 602a (e.g., with contact 605 detected on touch-sensitive surface 451 of remote 510). For example, as illustrated, the current focus indicator 620 is located on representation of content item 608a (e.g., "Sports Event A"). When the electronic device detects the input to scroll in the downward direction in the media browsing application user interface 602a, a different portion of the media browsing application user interface 602a is displayed and the current focus 620 shifts to representation of content item 610b which is illustrated in FIG. 6B. In response to the input illustrated in FIG. 6A, in FIG. 6B, the electronic device displays another part of the media browsing application user interface 602a (e.g., further down from the portion of the media browsing application user interface 602a illustrated in FIG. 6A) and the current focus indicator 620 is on representation of recommended content item 610b (e.g., "DOCU A S1:E1"). In some embodiments, the portion of the media browsing application user interface 602a in FIG. 6B includes a background preview image 606 of the respective content item that changes accordingly based on the content item that is the current focus.

As shown in FIG. 6B, the media browsing application user interface 602a includes a lower portion of the plurality of representations of content items 608a-608e, a plurality of representations of content items 610a-610e, and a plurality of representations of sports teams 612a-612e. The plurality of representations of content items 610a-610e includes recommended content based on user activity from other applications (as opposed to the first application). For example, the first application shown in FIG. 6B is a video content browsing and playback application and the other application is optionally a text-based content browsing and display application and/or a music content browsing and display application. In some embodiments, the plurality of representations of content items 610a-610e optionally includes recommended content based on the user activity from the first application (e.g., video content browsing and playback application) and also from the other applications.

As illustrated, a section of the media browsing application user interface 602a with a first heading (e.g., "Recommended content based on activity from other applications") includes representation of content item 610a (e.g., "Sports Event B"), representation of content item 610b (e.g., "DOCU A S1: E1"), representation of content item 610c (e.g., "Movie D"), representation of content item 610d (e.g., "Sports Event M"), and representation of content item 610e (e.g., "TV Show A S1:E1"), which are selectable to display the corresponding content item on display 514. The plurality of representations of content items 610a-610e are optionally different from the plurality of representations of content items 608a-608e because the representations of content items 610a-610e includes recommended content based on user activity from other applications whereas the representations of content items 608a-608e optionally included recommended content based on user activity in the first application and also from other applications. For example, the content item corresponding to representation of content item 610b (e.g., "DOCU A S1: E1") is optionally recommended based on a professional tennis player that the user read about in a news application (e.g., second application), whereas the content item corresponding to representation of content item 608c (e.g., "TV Show R S3:E5") is optionally a subsequent episode of TV show R, which the user viewed in the first application.

In some embodiments, the plurality of representations of content items 610a-610e selected for inclusion in the media browsing application user interface 602a is based on a determination of input for interaction with content items across various types of applications and not from the first application shown in FIG. 6B. For example, the electronic device receives input data indicating that in a second application (e.g., book browsing application), an autobiography of a world-renowned scientist was displayed and/or read. Accordingly, in some embodiments, the electronic device processes the input data to recommend the plurality of representation of content items 610a-610e in which at least one of the corresponding content items is content related the world-renowned scientist.

As further shown in FIG. 6B, the media browsing application user interface 602a includes second heading (e.g., "Recommended Sports Team to add as Favorites"), which includes a plurality of representations of sports teams 612a-612e. The plurality of representations of sports teams 612a-612e are optionally selectable to initiate a process to add the corresponding sports team to a "my favorite sports teams" list associated with the first application. In particular, the second heading includes representation of sports team 612a (e.g., "Team D"), representation of sports team 612b (e.g., "Team LL"), representation of sports team 612c (e.g., "Team LR"), representation of sports team 612d (e.g., "Team LD"), and representation of sports team 612e (e.g., "Team G").

In some embodiments, the plurality of representations of sports teams 612a-612e included in the media browsing application user interface 602a is based on user interaction with content across different types of applications. In some embodiments, the plurality of representations of sports teams 612a-612e are included in the media browsing application user interface 602a because the electronic device identifies the respective sports teams as teams that are of potential interest to the user. For example, the electronic device receives input data from the first application (e.g., video content browsing and playback application) indicating that the user viewed a NCAA basketball game that included Team D. Additionally or alternatively, the electronic device receives input data from a second application (e.g., a news application) indicating that the user read a post-game news article related to Team D. Accordingly, the electronic device optionally processes the input data and recommends Team D basketball team (e.g., representation of recommended sports team 612a in FIG. 6B) as a sports team to add as a favorite because the interaction with the first application and/or the second application indicates that the user watched a basketball game and/or read a news article related to Team D.

Figure 6D:
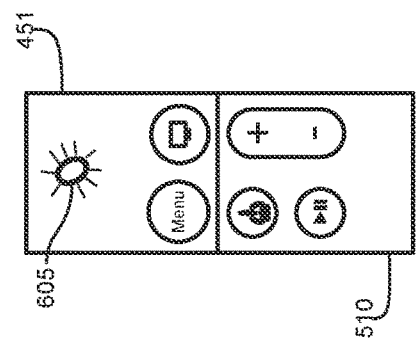
Figure 6C:
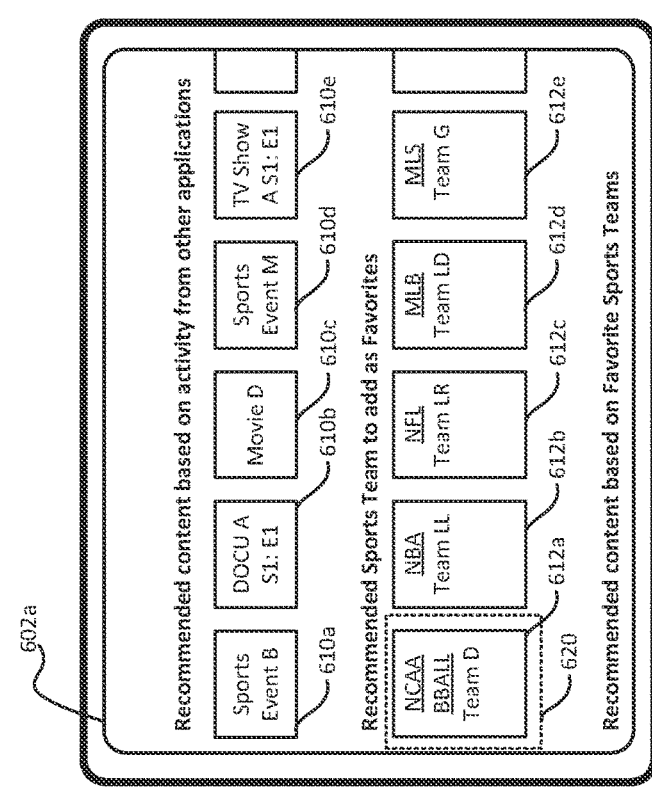

As further shown in FIG. 6B, the electronic device detects an input to scroll in a downward direction in the media browsing application user interface 602a (e.g., with contact 605 detected on touch-sensitive surface 451 of remote 510). In response to the input illustrated in FIG. 6B, in FIG. 6C, the electronic device displays another part of the media browsing application user interface 602a (e.g., further down from the portion of the media browsing application user interface 602a illustrated in FIG. 6B). As illustrated in FIG. 6C, the current focus indicator 620 of the electronic device is located on the representation of sports team 612a (e.g., "Team D"). With the current focus indicator 620 positioned on the representation of sports team 612a, the electronic device detects an input to select (e.g., with contact 605) the representation of sports team 612a. In response to the input to select the representation of sports team 612a, the electronic device presents a sports team management user interface 602b as shown in FIG. 6D. In some embodiments, the selection of any of the plurality of representations of sports teams 612a-612e in FIG. 6B causes the electronic device to present the sports team management user interface 602b of FIG. 6D.

FIG. 6D illustrates a sports team management user interface 602b for managing sports teams for the first application. As shown, a section of the sports team management user interface 602b with a first heading (e.g., Recommended Sports Team to add as Favorites) includes a plurality of representation of sports teams 612a-612e that are recommended to add to a "my favorites" list of the present application. In particular, the first heading includes representation of sports team 612a (e.g., "Team D"), representation of sports team 612b (e.g., "Team LL"), representation of sports team 612c (e.g., "Team LR"), representation of sports team 612d (e.g., "Team LD"), and representation of sports team 612e (e.g., "Team G"). In some embodiments, the plurality of representation of sports teams 612a-612e shown in the sports team management user interface 602b of FIG. D is the same as the plurality of representation of sports teams 612a-612e shown in the media browsing application user interface 602a of FIG. C.

As further illustrated in the sports team management user interface 602b, the sports team management user interface 602b includes a second heading (e.g., My Favorites), which is a list of favorite sports teams that are currently designated as a favorite sports teams. The second heading includes a plurality of representations of favorite sports teams 622a-622e that have been selected by the user. As shown, representation of favorite sport team 622a does not have a designated favorite NCAA basketball team, representation of favorite sport team 622b illustrates Team BC as a favorite NBA team, representation of favorite sport team 622c illustrates Team SS as a favorite NFL team, representation of favorite sport team 622d illustrates Team NY as a favorite MLB team, and representation of favorite sport team 622e does not have a designated favorite MLS team.

As shown, FIG. 6D includes a search icon 623. In some embodiments, when the search icon 623 is selected, the electronic device is configured to receive input and perform a search to identify a sports team based on the input of the user. In response to identifying a sports team based on the input, the electronic device is configured to provide a current status associated with the sports team such as the type of sport that is associated with the sports team, whether the sports team is designated as a favorite, and/or whether the user has consumed content associated with the sports team.

As further illustrated in FIG. 6D, the current focus indicator 620 of the electronic device is on the representation of sports team 612a (e.g., "Team D"). With the current focus indicator 620 positioned on representation of sports team 612a, the electronic device detects an input to select (e.g., with contact 605) the representation of sports team 612a to select and add Team D to the "my favorites" list. In response to the input to select representation of sports team 612a, the electronic device updates the sports team management user interface 602b, which is illustrated in FIG. 6E.

As shown in FIG. 6E, the sports team management user interface 602b is updated to reflect Team D as a favorite NCAA basketball team. As shown, the first heading (e.g., Recommended Sports Team to add as Favorites) includes a plurality of representations of sports teams 612b-612e that are shifted to the left (compared to FIG. 6D) in the sports team management user interface 602b because the representation of sports team 612a was selected to designate Team D as a favorite sports team. As further illustrated, the representation of sports team 612a in the second heading (e.g., My Favorites) is updated to reflect the selection of Team D as being designated as a favorite NCAA basketball team.

As further shown in FIG. 6E, the electronic device detects an input to scroll in a downward direction in the sports team management user interface 602b (e.g., with contact 605 detected on touch-sensitive surface 451 of remote 510). In response to the input illustrated in FIG. 6E, in FIG. 6F, the electronic device displays another part of the sports team management user interface 602b (e.g., further down from the portion of the media browsing application user interface 602a illustrated in FIG. 6E). As shown in FIG. 6F, the sports team management user interface 602b includes a lower portion of the plurality of representations of sports teams 612b-612e, the plurality of representations of favorite sports teams 622a-622e, and a plurality of representations of all sports teams 624a-624e. The plurality of representations of all sports teams 624a-624e includes selectable options to launch and display a list of all sports teams that are not presently designated as a favorite team. For example, a selection of representation of all sports teams 624a will include a listing of all NCAA basketball teams except Team D, a selection of representation of all sports teams 624b will include a listing of NBA basketball teams except for Team BC, a selection of representation of all sports teams 624c will include a listing of NFL football teams except for Team SS, a selection of representation of all sports teams 624c will include a listing of MLB baseball teams except for Team NY, and a selection of representation of all sports teams 624e will include a listing of all MLS soccer teams because the user has not designated any MLS team as a favorite sports team. From these lists, the user is able to provide input to designate one or more of the sports teams as favorite teams.

As illustrated in FIG. 6F, the current focus indicator 620 of the electronic device is located on the representation of all sports teams 624*a* (e.g., "NCAA BBALL"). If the electronic device detects an input to select (e.g., with contact 605) the representation of all sports teams 624*a*, the electronic device will generate and present a listing of all NCAA basketball teams except Team D. In the example shown in FIG. 6F, the electronic device detects a click of menu button 516 of remote 510, which optionally corresponds to a backward navigation input within a currently-active navigation hierarchy on the electronic device (e.g., as described with reference to FIG. 5B). In response to the click of menu button 516, the electronic device exits the sports team management user interface 602*b* and navigates backward within the application to return to a previous portion of the media browsing application user interface 602*a* (e.g., back to the user interface shown in FIG. 6C), as shown in FIG. 6G.

Figure 6H:
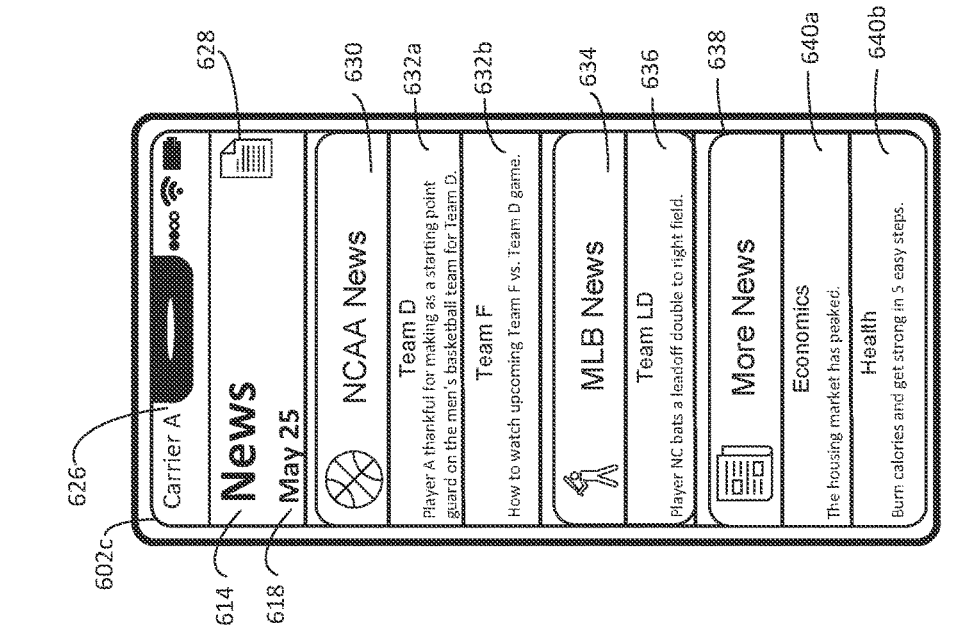
Figure 6G:
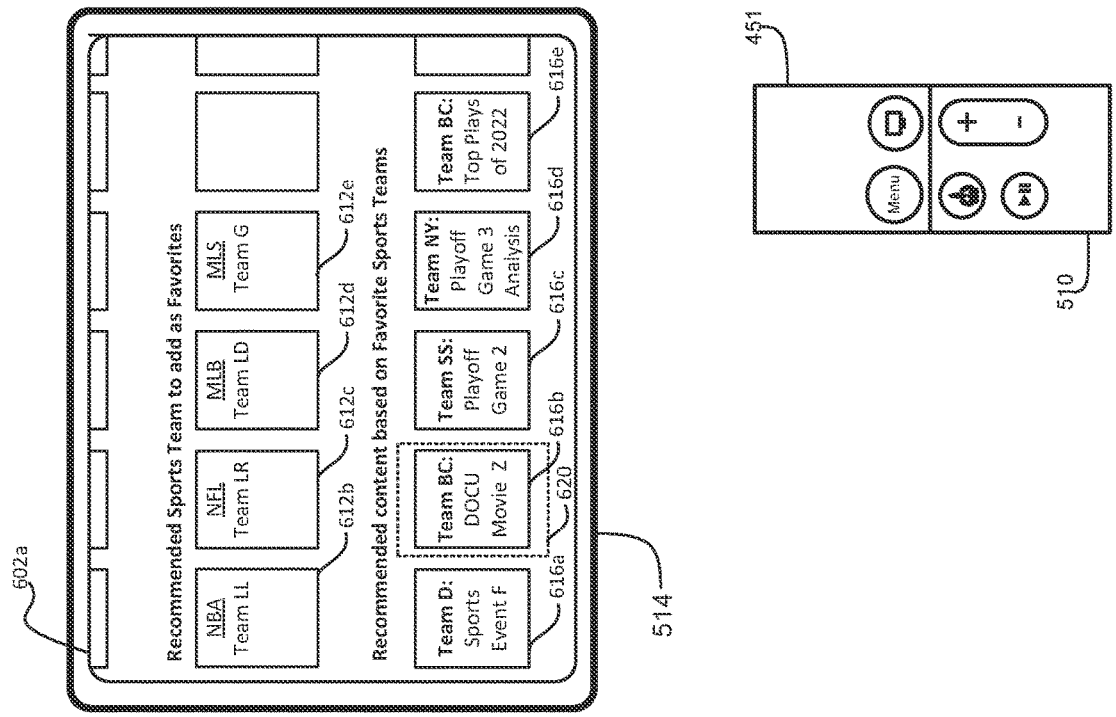

In FIG. 6G, the media browsing application user interface 602*a* has been updated to reflect Team D as a favorite NCAA basketball team. Accordingly, as shown, the media browsing application user interface 602*a* with the second heading (e.g., "Recommended Sports Team to add as Favorites") includes a plurality of representations of sports teams 612*b*-612*e* and does not include representation of sports team 612*a* because Team D was added as a favorite sports team as noted above. As further illustrated, the media browsing application user interface 602*a* with a third heading (e.g., "Recommended content based on Favorite Sports Teams") includes a plurality of representations of content items 616*a*-616*e* that are based on the favorite sports teams of the user. In particular, the third heading includes representation of content item 616*a* (e.g., "Team D: Sports Event F"), representation of content item 616*b* (e.g., "Team BC: DOCU Movie Z"), representation of content item 616*c* (e.g., "Team SS: Playoff Game 2"), representation of content item 616*d* (e.g., "Team NY: Playoff Game 3 Analysis"), and representation of content item 616*e* (e.g., "Team BC: Top Plays of 2022").

The plurality of representations of content items 616*a*-616*e* are optionally different from the plurality of representations of content items 610*a*-610*e* and the plurality of representations of content items 608*a*-608*e*, because the plurality of representations of content items 616*a*-616*e* optionally includes recommend content items that are based on sports teams that are designated as favorite sports teams, whereas the plurality of representations of content items 610*a*-610*e* includes recommended content based on user activity from other applications, and the representations of content items 608*a*-608*e* include recommended content based on user activity in the first application and/or other applications. In this way, by recommending content items that are based on sports teams that are designated as favorite sports teams, the number of inputs needed for a user to sort through and identify specific content relating to those that are identified as favorite sports teams is reduced.

FIG. 6H illustrates an example of a text-based content user interface 602*c* of a second application (e.g., text-based content browsing and display application) displayed on touch-sensitive display 626 by an electronic device (e.g., mobile phone). In some embodiments, user interface 602*c* is displayed on the device illustrated in FIGS. 6A-6G. The second application is optionally used to view text-based content such as news articles, books, and/or magazines. In particular, the second application is optionally used to view various content items, whether or not they are recommended or of interest to the user, such as, sports related news and other news such as economics and health. As shown in FIG. 6H, the text-based content user interface 602*c* of the second application includes a heading 614 (e.g., News), a current date (e.g., May 25), a first section 630 (e.g., NCAA News), a second section 634 (e.g., MLB News), and a third section 638 (e.g., More News). The first section 630 includes representations of content items 632*a*-632*b*, which when selected, cause the electronic device to display recommended NCAA news articles related to Team D (e.g., "Player A thankful . . . ") and to Team F (e.g., "How to watch upcoming . . . "). The second section 634 includes representation of content item 636, which when selected, causes the electronic device to present an MLB recommended news article related to Team LD (e.g., "Player NC bats . . . "). The third section 638 includes representations of content items 640*a*-640*b*, which when selected, cause the electronic device to present general recommended news articles related to economics (e.g., "The housing market has peaked") and to health (e.g., "Burn calories . . . ").

The plurality of representations of content items (e.g., 632*a*-632*b*, 636, 640*a*-640*b*) in FIG. 6H representing recommended content items are optionally presented by the electronic device in the user interface of the second application for various reasons. In some embodiments, the recommended content items are identified as being of potential interest to the user based on various factors such as topics designated as interest to the user, sports teams that are designated as favorite sports teams, and/or user interaction with content items across various applications (e.g., first application and/or second application), as previously described. For example, representation of content item 632*a* represents an NCAA news article related to Team D. Representation of content item 632*a* is optionally presented by the electronic device because the user designated Team D as a favorite sports team when interacting with the first application (as noted above with reference to FIGS. 6D-6E). In this way, recommending content items based on the activity of the user makes content that the user may be interested in viewing easily accessible, thereby reducing power usage and improving the battery life of the electronic device.

In FIG. 6I, the electronic device detects an input including a tap of touch contact 642 on the touch-sensitive display 626 of the electronic device. For example, as illustrated in the FIG. 6I, the touch contact 642 is detected by the electronic device on representation of content item 632*b*, and causes the electronic device to display an NCAA news article related to an upcoming game that includes Team F and Team D, as shown in FIG. 6J. In response to the tap gesture, in FIG. 6J, the electronic device displays, in the text-based content user interface 602*c*, the news article corresponding to representation of content item 632*b*, which includes textual information providing details related to an upcoming game that includes Team F and Team D. For example, a section 646 of the text-based content user interface 602*c* includes various information such as game date, game time, TV channel, and a selectable option to watch the game live in Application 1. In some embodiments, in response to the tap gesture to display the NCAA news article related to an upcoming game that includes Team F and Team D, the electronic device optionally recommends content items in the first application that relate to Team F and Team D. For example, referring to FIG. 6B, Team F is optionally included as a recommended sports team to add as a favorite team, and the representations of content items optionally include video content related to Team F and/or Team D because the user consumed a news article in the second application that relates to Team F and Team D.

As further shown in FIG. 6J, user interface 602c includes a selectable option 644, which when selected, causes the electronic device to navigate back to the previous portion of the text-based content user interface 602c (e.g., back to home menu of the second application shown in FIG. 6I). For example, in response to a tap gesture by touch contact 642 on option 644, the electronic device exits the news article and navigates back to the previous portion of the text-based content user interface 602c, as shown in FIG. 6K.

In FIG. 6K, the text-based content user interface 602c includes a selectable settings option 628, which when selected, causes the electronic device to display a sports management user interface for the second application. For example, as illustrated in FIG. 6K, the electronic device detects a tap gesture by touch contact 642 on the settings option 628 and displays the sports management user interface shown in FIG. 6L.

As shown in FIG. 6L, the sports management user interface includes a heading 648 (e.g., "Manage My Sports Teams"), a first portion 650 (e.g., "Recommended Sports Teams to add as Favorites"), a second portion 652 (e.g., "My Favorites"), and a third portion 654 (e.g., "All Sports Teams"). The first portion 650 includes recommended sports teams to add as a favorite, which when selected, cause the electronic device to add the respective sports team to the second portion 652 of the sports management user interface. For example, the recommended sports teams include Team LL, Team LR, Team LD, and Team G. The second portion 652 includes a current list of sports teams that are designated as the user's favorites. For example, the favorite teams of the user includes Team D, Team BC, Team SS, and Team NY. The third portion 654 includes a selectable option to display and/or sort through all sports teams other than those that are designated as a favorite sports team. For example, as illustrated in FIG. 6L, the selection of the NBA option causes the electronic device to display a list of all NBA sports teams except for Team BC, which is designated as a favorite. In response to selecting a particular sports team, the electronic device adds the respective sports team to the second portion 652 (e.g., "My Favorites") of the sports management user interface. In some embodiments, favorite sports teams across two applications (e.g., the first application and the second application) are synchronized. For example, referring to FIG. 6F, the teams designated as favorite teams in the first application include Team D, Team BC, Team SS, and Team NY, which are the same teams that are designated as favorite teams in the second application.

Figure 7:
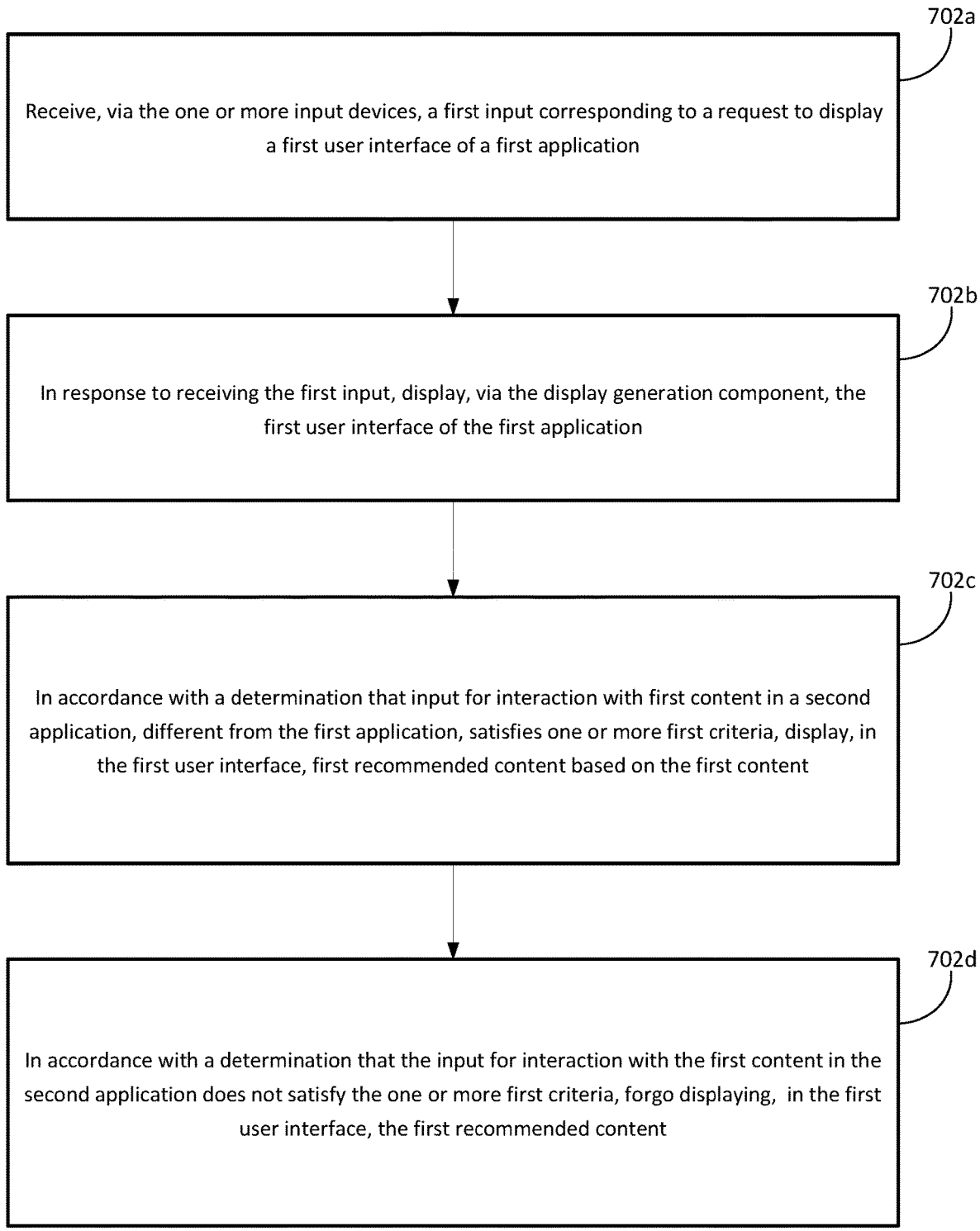
FIG. 7 is a flow diagram illustrating a method in which an electronic device recommends content in a first application based on an interaction of a user with a second application in accordance with some embodiments of the disclosure.

FIG. 7 is a flow diagram illustrating a method in which an electronic device recommends content in a first application based on an interaction of a user with a second application in accordance with some embodiments of the disclosure. The method 700 is optionally performed at first and/or electronic devices such as device 100, device 300, or device 500 as described above with reference to FIGS. 1A-1B, 2-3, 4A-4B and 5A-5C. Some operations in method 700 are, optionally combined and/or order of some operations is, optionally, changed.

As described below, the method 700 provides ways in which first and/or second electronic devices facilitate synchronizing information about content across different applications to recommend related content to a user of the electronic device. Synchronizing information about content across different applications and recommending content to a user in a first application based on the activity of the user in a second application makes content that the user may be interested in viewing easily accessible, thus reducing the number of inputs needed to sort through and identify content that the user may have an interest in, thereby reducing power usage and improving the battery life of the electronic device.

In some embodiments, method 700 is performed at an electronic device (e.g., 500) in communication with a display generation component (e.g., 514) and one or more input devices (e.g., 510). For example, a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, method 700 is performed at or by an automobile (e.g., at an infotainment system of an automobile having or in communication with one or more display generation components and/or input devices).

In some embodiments, the electronic device receives (702a), via the one or more input devices, a first input corresponding to a request to display a first user interface of a first application, such as user interface 602a in FIG. 6A (e.g., a tap or other selection of a first application icon to launch and/or display the user interface of the first application; or hand gesture in space such as pointing or pinching at an icon or other selectable option in an augmented reality (AR) or virtual reality (VR) environment to launch and/or display the first user interface; or an input using an interface controller in an AR or VR environment to provide input to select an icon or other selectable option to launch and/or display the first user interface). In some embodiments, the first application icon is displayed on a home screen user interface of the electronic device, such as described with reference to FIG. 4A. The first application is optionally an application for browsing and/or presenting content of a first type. For example, content of the first type includes video content, such as live sports events, movies, episodes of TV shows, and/or music videos).

In some embodiments, in response to receiving the first input, the electronic device displays (702b), via the display generation component, the first user interface of the first application, such as user interface 602a in FIG. 6A (e.g., the first user interface optionally is or includes a home user interface of the first application that includes representations of various content offered and/or available via the first application). In some embodiments, the representations are selectable to cause display of the corresponding content.

In some embodiments, in accordance with a determination that input for interaction with first content, such as representation of content item 632b in FIG. 6I (of a second type) in a second application, such as in FIGS. 6H-6L, different from the first application, such as in FIGS. 6A-6G (An example of input for interaction with the first content optionally includes prior user input (e.g., prior to the first input) detected in a user interface of the second application for displaying and/or reading a news article. In some embodiments, the second application is an application for browsing and/or presenting content of a second type (e.g., news articles), different from the first type (e.g., live sports events, movies, or TV shows). For example, the input for interaction with the first content is optionally an input to display a news article related to an upcoming professional basketball game in the second application. In some embodiments, the input for interaction with the first content in the second application was detected at the electronic device; in some embodiments, the input for interaction with the first content in the second application was detected at a second electronic device, different from the electronic device, where the electronic device and the second electronic device are both associated with (e.g., logged into) the same user account or profile. In some embodiments, the first content is content of the second type, different from the first type), satisfies one or more first criteria (e.g., in some embodiments, the one or more first criteria include a criterion that is satisfied when the first content is related to content available for presentation in the first application (e.g., one of the sports teams mentioned in the news article is playing or will soon be playing in a live sporting event). In some embodiments, the one or more first criteria include a criterion that is satisfied when content in the second application has been accessed more than a threshold number of times (e.g., 1, 3, 5, 7 or 10). In some embodiments, the one or more first criteria include a criterion that is satisfied when the entirety news article was read), the electronic device displays (702*c*), in the first user interface, first recommended content (of the first type) based on the first content (of the second type), such as representations of content items 608*a*-608*e* in FIG. 6A. For example, the first recommended content of the first type optionally includes a recommendation to watch a live viewing of a Duke vs. University of North Carolina basketball game, because the user provided input for displaying an article related to the Duke basketball game in the second application. In some embodiments, the electronic device displays a representation of the first recommended content in the first user interface that is selectable to initiate a process to display the first recommended content via the display generation component. In some embodiments, the input for interaction with the first content (of the second type) is in the first application and/or the second application (e.g., the application in which the interaction with the first content was detected is irrelevant, and the features of method 700 still apply).

In some embodiments, in accordance with a determination that the input for interaction with the first content (of the second type) in the second application does not satisfy the one or more first criteria (e.g., one or more of the above-described criteria are not satisfied and/or there has been no prior input for interaction with the first content), the electronic device forgoes displaying (702*d*), in the first user interface, the first recommended content (of the first type) (e.g., no recommendations are provided by the electronic device based on prior user interaction with content in the second application). In some embodiments, the electronic device still provides recommended content in the first user interface, but the recommendations are based on factors other than content consumption activity of the user in the second application (e.g., the recommendations are based on prior content consumption activity of the user in the first application). Recommending content to a user in a first application based on the activity of the user in a second application makes content that the user may be interested in viewing easily accessible, thus reducing the number of inputs needed to sort through and identify content that the user may have an interest in, thereby reducing power usage and improving the battery life of the electronic device.

In some embodiments, the first recommended content includes a representation of a sports team, such as representations of sports teams 612*a*-612*e* in FIG. 6B (e.g., a professional sports team, such as a sports team in the NBA, MLB, MLS, NFL, NCAA, or other professional sports league), that is selectable to designate the sports team as a favorite sports team (e.g., in the first application and/or second application). In some embodiments, designating a sports team as a favorite sports team causes the electronic device to display recommended content based on the favorite sports team, including one or more of live sporting events including the favorite sports teams, movies related to the favorite sports team, books related to the favorite sports team, or the like, as described in more detail herein. In some embodiments, the first recommended content is a recommended athlete (as opposed to a sports team) as a favorite athlete, and results in the electronic device recommending content related to the favorite athlete in one or more of the ways described herein. In some embodiments, the recommendation of sports teams, the recommendation of an athlete, and/or recommendation of other content is refreshed in real-time so that a user of the electronic device receives the most recent recommendations based on the inputs detected by the electronic device. Recommending sports teams for favoriting reduces the number of inputs needed for a user to identify and favorite a sports team, thus reducing the number of inputs needed to receive subsequent recommended content based on that favorite sports team.

In some embodiments, the first application is a video content browsing and playback application, such as in FIGS. 6A-6G, and the first recommended content includes a representation of a video content item (e.g., sports events, movies, episodes of TV shows, and/or music videos) that is selectable to display the video content item, such as representations of content items 608*a*-608*e* in FIG. 6A (e.g., in the first application). For example, the representation of the video content item is included in the first user interface of the first application. In response to selecting the representation of the video content item, the electronic device launches and/or displays the video content item in the first user interface or in a separate user interface of a different application. In some embodiments, the video content browsing and playback application include features such as fast forwarding, rewind, and/or selection of playback speeds to allow the user to watch specific portions of the video content item and/or to watch the video content item at a desired playback speed. Recommending video content items reduces the number of inputs needed for a user to identify video content (as opposed to text-based content) of interest, thus reducing the number of inputs needed to receive video content of interest, thereby the power usage of the electronic device is reduced, and battery life of the electronic device is improved.

In some embodiments, the first recommended content is recommended based on a sports team that is identified as a favorite sports team in the first application (e.g., video content browsing and playback application) or the second application, such as representations of favorite sports teams 622*a*-622*e* in FIG. 6E (e.g., text-based content application, such as a news or electronic book application). In some embodiments, the first application and/or the second application provide a selectable option to designate particular sports teams as favorite sports teams. In some embodiments, in response to input selecting the selectable option(s), the electronic device designates the corresponding sports team(s) as favorite sports team(s) for purposes of the first and/or second application. The sports teams that are designated as favorites are optionally used to recommend content that relates to the favorite sports teams. For example, if Team BC is selected and designated as a favorite NBA team in the second application (or the first application), the second application and/or the first application recommends related content based on Team BC. In some embodiments, the recommended content is not based on sports teams that are recommended as favorite sports teams to the user in the first and/or second application, but not designated as favorite sports teams based on user input. Recommending content to a user in a first application or a second application based on teams that are selected as a favorite team reduces the number of inputs needed to display content of interest, thus, less time is spent operating the electronic device and battery life of the electronic device is improved by enabling the user to efficiently select recommended content that relates to their favorite sports teams.

In some embodiments, the first recommended content is recommended based on text-based content (e.g., news articles or electronic books) consumed (e.g., reading, browsing and/or displaying the text-based content) in the second application, wherein the text-based content consumed in the second application is related to one or more sports teams, such as in FIG. 6J. In some embodiments, consuming text-based content that is related to a particular sports team is one factor in determining whether the user is interested in the particular sports team. Accordingly, in some embodiments, the electronic device detects input for interaction with text-based content in the second application to determine which sports teams the user is potentially interested in. In turn, in some embodiments, the electronic device recommends text-based content and/or video content that are related to the sports teams that the electronic device identifies as being of potential interest to the user. Recommending content related to a sports team based on content that the user consumed in the second application reduces the number of inputs needed to display content of interest, thus, less time is spent operating the electronic device and battery life of the electronic device is improved by enabling the user to efficiently select recommended content that relates to their favorite sports teams.

In some embodiments, the first recommended content is a video content version of respective content (e.g., a story), such as representation of content item 608*d* in FIG. 6A. For example, the first recommended content is a movie version of a story or book.

In some embodiments, the first recommended content is recommended based on a text-based version (e.g., news articles, books, and/or magazines) of the respective content consumed in the second application (e.g., application for displaying and/or reading text-based content), such as representation of content item 632*b* consumed in the second application of FIGS. 6I-6J. For example, the text-based version of the respective content is a book version of the story. For example, if the text-based version of the respective content consumed relates to a Harry Potter fantasy fiction book, the recommended video content includes a movie about Harry Potter. Recommending a video content version of a respective content in a first application based on a text-based version of the content consumed in a second application enables the user to quickly find video content that is related to a text-based version of the respective content consumed by the user in the second application or different application, thus reducing the number of inputs needed to access recommended content in the first application based on user interactivity in the second application.

In some embodiments, the first application is a text-based content browsing and display application, and the first recommended content includes a representation of a text-based content item that is selectable to display the text-based content item, such as in FIGS. 6H-6L. In some embodiments, the first application is a text-based browsing and display application which can be used to locate and display various types of text-based content item such as news articles, magazine articles, and/or electronic books. In one example, the electronic device is configured to display representations of text-based content items that are of potential interest to the user in the first application. Recommending text-based content items in a first application reduces the number of inputs needed for a user to identify text-based content items (as opposed to video content items) of interest, thus reducing the number of inputs needed to access the text-based content items, thereby less time is spent operating the electronic device and battery life of the electronic device is improved.

In some embodiments, the text-based content item is recommended based on a sports team that is identified as a favorite sports team in the first application or the second application, such as in my favorites in FIG. 6L. In some embodiments, the first application and/or the second application provide a selectable option to designate particular sports team as favorite sports teams. In some embodiments, in response to input selecting the selectable option(s), the electronic device designates the corresponding sports teams (s) as favorite sports teams(s) for purposes of the first and/or second application. The sports teams that are designated as favorites are optionally used to recommend text-based content items that relates to the favorite sports teams. For example, the user interface of the electronic device includes a text-based content item such as a post-game analysis article related to a sporting event that involves Team BC and Team NY because the respective teams are designated as favorite sports teams. Recommending text-based content items based on sports teams that are selected as a favorite team reduces the number of inputs needed to display text-based content items of interest. Thus, less time is spent operating the electronic device and battery life of the electronic device is improved by enabling the user to efficiently select text-based content that relates to their favorite sports teams.

In some embodiments, the first recommended content is recommended based on video content consumed in the second application, wherein the video content consumed in the second application is related to one or more sports teams, such as representation of content item 636 in FIG. 6I having a corresponding highlight video clip showing Player NC hitting a leadoff double in the game. In some embodiments, the second application is optionally an application for browsing and/or presenting video content such as live sports events, movies, episodes of TV shows, and/or music videos. In response to detecting input for interaction with a video content related to a sports team in the second application (e.g., an input to display a sports game including two teams), the electronic device is configured to display the first recommended content based on the sports team (e.g., display recommended content related to one or both of the sports teams). In some embodiments, the recommended content is a text-based content item or a video content item. Recommending content items based on video content of a sports team consumed in a second application enables the user to quickly find recommend content items based on their activity in a different application, thus reducing the number of inputs needed to access recommended content in the first application and in turn, improves the battery life of the electronic device.

In some embodiments, the first recommended content is a text content version of respective content (e.g., a story), such as one of the representations of content items 608 of FIG. 6A including an option to display a book. For example, the first recommended content is a book version of a story. In some embodiments, the first recommended content is recommended based on a video-based version (e.g., movies and/or episodes of TV shows) of the respective content consumed in the second application, such as the user interface 602c of FIG. 6H, includes a representation of video content consumed in the second application (e.g., a movie version of the book or the story). In some embodiments, the second application is optionally an application for browsing and/or presenting video content. In one example, if the video-based version of the respective content relates to a romance genre movie, the recommended text content version of the respective content includes a book related to the romance genre movie consumed in the second application. Recommending a text version of a respective content based on a video-based version of the respective content consumed in the second application enables the user to quickly find recommend text content versions of a respective content related to a video-based version of the respective content consumed by the user in the second application. Thus, reducing the number of inputs needed to access recommended content in the first application based on user interactivity in the second application.

In some embodiments, the first recommended content is related to a person and recommended based on text-based content consumed in the second application, wherein the text-based content consumed in the second application is related to the person, such as if representation of content item 632a consumed in FIG. 6H relates to Player A. In one example, in response to detecting that the user read or provided input to display an autobiography book related to an influential scientist in the second application, the electronic device is configured to display recommend content related to the scientist in the first application (e.g., a documentary about the scientist, or a movie about the scientist). In some embodiments, the content related to the scientist is video content and/or text-based content that is presented by the electronic device in the first application. Recommending content related to a person that is based on text-based content consumed in the second application enables the user to quickly find recommended content related to a person based on their activity in a different application, thus reducing the number of inputs needed to access recommended content related to a person in the first application.

In some embodiments, the first recommended content is related to a person and recommended based on video content consumed in the second application, wherein the video content consumed in the second application is related to the person, such as representation of content item 636 in FIG. 6H having a corresponding highlight video clip consumed in the second application relating to Player NC. In some embodiments, the second application is optionally an application for browsing and/or presenting video content. In one example, in response to detecting that the user watched and/or provided input to display a biographical film that is related to a professional tennis player in the second application, the electronic device is configured to display recommend content related to the professional tennis player first application (e.g., an article about the professional tennis player, or an autobiography book related to the professional tennis player). In some embodiments, the content related to the professional tennis player is video content and/or text-based content that is presented by the electronic device in the first application. Recommending content related to a person that is based on video content consumed in the second application enables the user to quickly find recommended content related to a person based on their activity in a different application, thus reducing the number of inputs needed to access recommended content related to a person in the first application.

In some embodiments, the first application tracks one or more favorite sports teams of a user of the electronic device, the second application tracks one or more favorite sports teams of the user of the electronic device, and the one or more sports teams tracked in the first application and the one or more sports teams tracked in the second application are synchronized, such as representations of favorite sports teams 620a-622e in FIG. 6E and my favorites in FIG. 6L. For example, a first application is a video content browsing and playback application used to watch NFL football sporting events where first application detects user input data indicating that Team LR is a favorite football team of the user. A second application is optionally a text-based content browsing and display application and is used to consume text-based content related to MLS soccer games where the second application detects user input data indicating that Team G is a favorite soccer team of the user. Because both the first application and the second application are synchronized, the first application and the second application both include and/or operate (in one or more of the ways described herein) according to at least Team LR and Team G being identified as favorite sports teams of the user. In some embodiments, already-favorited sports teams from the first application and/or second application are displayed as favorites and synchronized across the various applications. Synchronizing favorite sports teams across two applications provides an effective and efficient way to organize a list of favorite sports teams that are designated as favorites across a plurality of applications, reducing the number of inputs needed to designate a sports team as a favorite sports team on a particular application when it was already designated as such on a different application.

In some embodiments, the first recommended content includes one or more representations of one or more sports teams, such as in representations of sports teams 612a-612e in FIG. 6D, wherein input (e.g., clicking on a remote to select a representation of a sports team or tapping on a touch-sensitive display of the device to select an icon of the sports teams) associated with the one or more representations of the one or more sports teams designates the corresponding sports teams as favorite sports teams in the first application, such as representations of favorite sports teams 622a-622e in FIG. 6D. In some embodiments, clicking (via a remote) or tapping (via a touch-sensitive display of the device) on the representation of the sports team designates the selected sports team as a favorite team (e.g., in the first application and/or in the second application). In one example, the selected sports team is added to a listing of "my favorites" sports teams, which are optionally categorized by the type of sport. Recommending one or more sports teams and providing a selectable option to designate the corresponding sports teams as favorite sports teams reduces the number of inputs needed for a user to identify and favorite a sports team, thus reducing the number of inputs needed to receive subsequent recommended content based on that favorite sports team.

In some embodiments, while displaying the first recommended content, including a first representation of a first sports team, the electronic device receives, via the one or more input devices, a second input corresponding to a request to designate the first sports team as a favorite sports team, such as representations of sports team 612a-612e in FIG. 6C (e.g., selection of a selectable option displayed in the first or second application to designate the first sports team as a favorite sports team). In some embodiments, in response to receiving the second input, the electronic device designates the first sports team as a favorite sports team, and initiates a process to recommend additional recommended content (in the first application and/or the second application) based on the first sports team, such as with respect to representations of content items 616a-616e in FIG. 6G. For example, in response to designating a sports team as a favorite, the recommendation of additional recommended content includes content that relates to the sports team that is designated as a favorite sports team. Recommending additional recommended content based on the designated favorite sports team reduces the number of inputs needed for a user to identify content related to the favorite sports team, thereby reducing power usage and improving the battery life of the electronic device.

In some embodiments, the first recommended content (and optionally other recommended content included in the first user interface of the first application) is recommended based on one or more sports teams that are recommended as favorite sports teams in the first application or the second application, independent or whether the one or more recommended sports teams are added as favorite sports teams, such as representations of content items 608 in FIG. 6A. For example, the electronic device is configured to recommend a plurality of sports teams that are recommended to the user to designate as favorite sports teams, as described herein. In some embodiments, the recommended content is recommended based on the plurality of sports teams regardless of whether any of the plurality of sports teams are designated by the user as a favorite sports team. Recommending content based on recommended sports teams reduces the number of inputs needed for a user to identify content that is related to the recommended sports teams, thus reducing the number of inputs needed to receive subsequent recommended content based on the recommended sports teams.

In some embodiments, the first recommended content is recommended based on one or more sports teams that are designated as favorite sports teams, and not based on one or more sports teams that are recommended but not designated as favorite sports teams, such as representations of content items 616a-616e in FIG. 6G. In some embodiments, the first recommended content includes representations of video content and/or text-based content that relate to favorite sports teams. The selection to designate sports teams as favorite teams is optionally detected in the first application and/or second application, and is optionally in response to the sports teams being recommended as favorite sports teams by the first and/or second applications, or independent of the sports teams being recommended as favorite sports teams by the first and/or second applications (e.g., the one or more sports teams that are designated as favorite sports teams were not recommended in the first and/or second application as favorite sports teams). Recommending content based on sports teams that are designated as a favorite reduces the number of inputs needed for a user to sort through and identify specific content relating to those that are identified as favorite sports teams, thus reducing the number of inputs needed to receive subsequent recommended content based on their favorite sports teams.

In some embodiments, the first recommended content is based on a location of the electronic device, one or more topics designated as of interest to a user of the electronic device, one or more indications related to one or more sources of content, or a combination of two or more thereof, such as the electronic device in FIG. 6H geographically located in Maui and the settings option 628 of the second application having basketball, baseball, and golf selected as favorite sports. In some embodiments, the first recommended content is based on the geolocation of the electronic device. For example, if the user of the electronic device is on vacation in Maui, the recommended content optionally includes representations of sports events that are occurring locally in Maui, such as a golf tournament. In some embodiments, the first recommended content is based on topics that are designated as of interest to a user. The topics of interest are optionally selected in the first application and/or the second application based on user input, and are optionally synchronized across the applications. In some embodiments, the first recommended content is based on the sources of content that are installed and/or active on the electronic device. For example, the electronic device optionally includes a downloaded MLB application and a downloaded Golf application, which indicates that the user has an interest in MLB baseball and/or golf. Using these indications, the recommended content optionally includes representations of content that relate to baseball and/or golf. In some embodiments, the first recommended content is based on specific channels in the first application and/or second application that are designated as favorite channels. For example, if the user of the electronic device designates the NBA channel and NFL channel of a respective application as a favorite channel, the recommended content optionally includes representations of sports events that relate to basketball (optionally NBA basketball) and football (optionally NFL football). Recommending content based on factors such as location of the electronic device, topics designated as interest to a user, and/or indications related to one or more sources of content reduces the number of inputs needed for a user to identify content that may be of interest to the user, thus reducing power usage and improving the battery life of the electronic device.

In some embodiments, method 700 is performed at an electronic device (e.g., device 500) in communication with a display generation component and one or more input devices (e.g., a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIG. 7 are, optionally, implemented by components depicted in FIGS. 1A-1B. For example, receiving operation 702a and displaying operations 702b and 702c are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is synchronizing information about content across different applications to recommend related content to a user of the electronic device. The present disclosure contemplates that in some instances, the data utilized may include personal information data that uniquely identifies or can be used to contact or locate a specific person. Such personal information data can include demographic data, content consumption activity, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, content consumption activity across various applications can be used to suggest content to a user. Accordingly, use of such personal information data enables users to use electronic devices in coordinated manners. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of network services, the present technology can be configured to allow users to select to "opt in" or "opt out" of participation in the collection of personal information data during registration for services or anytime thereafter. In another example, users can select not to enable content consumption activity tracking in a specific application (e.g., first application and/or second application). In addition to providing "opt in" and "opt out" options, the present disclosure contemplates providing notifications relating to the access or use of personal information. For instance, a user may be notified upon initiating content playback that their personal information data will be accessed and then reminded again just before personal information data is accessed by the device(s).

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content and other user interfaces optionally include recommended content items in accordance with the embodiments of the disclosure without tracking the content consumption activity of the user.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device in communication with a display generation component and one or more input devices:
receiving, via the one or more input devices, a first input corresponding to a request to display a first user interface of a first application;
in response to receiving the first input, displaying, via the display generation component, the first user interface of the first application, including:
in accordance with a determination that input for interaction with first content in a second application, different from the first application, satisfies one or more first criteria, displaying, in the first user interface, first recommended content based on the first content; and
in accordance with a determination that the input for interaction with the first content in the second application does not satisfy the one or more first criteria, forgoing displaying, in the first user interface, the first recommended content;
while displaying the first recommended content, including a first representation of a first entity, receiving, via the one or more input devices, a second input corresponding to a request to designate the first entity as belonging to a user-defined set of entities; and
in response to receiving the second input, designating the first entity as belonging to the user-defined set of entities, and initiating a process to recommend additional recommended content based on the first entity.

2. The method of claim 1, wherein the first recommended content includes a representation of a sports team that is selectable to designate the sports team as a favorite sports team.

3. The method of claim 1, wherein the first application is a video content browsing and playback application, and the first recommended content includes a representation of a video content item that is selectable to display the video content item.

4. The method of claim 3, wherein the first recommended content is recommended based on a sports team that is identified as a favorite sports team in the first application or the second application.

5. The method of claim 3, wherein the first recommended content is recommended based on text-based content consumed in the second application, wherein the text-based content consumed in the second application is related to one or more sports teams.

6. The method of claim 3, wherein:
the first recommended content is a video content version of respective content; and
the first recommended content is recommended based on a text-based version of the respective content consumed in the second application.

7. The method of claim 1, wherein the first application is a text-based content browsing and display application, and the first recommended content includes a representation of a text-based content item that is selectable to display the text-based content item.

8. The method of claim 7, wherein the text-based content item is recommended based on a sports team that is identified as a favorite sports team in the first application or the second application.

9. The method of claim 7, wherein the first recommended content is recommended based on video content consumed in the second application, wherein the video content consumed in the second application is related to one or more sports teams.

10. The method of claim 7, wherein:
the first recommended content is a text content version of respective content; and
the first recommended content is recommended based on a video-based version of the respective content consumed in the second application.

11. The method of claim 7, wherein:
the first recommended content is related to a person and recommended based on text-based content consumed in the second application, wherein the text-based content consumed in the second application is related to the person.

12. The method of claim 7, wherein:
the first recommended content is related to a person and recommended based on video content consumed in the second application, wherein the video content consumed in the second application is related to the person.

13. The method of claim 1, wherein the first application tracks one or more favorite sports teams of a user of the electronic device, the second application tracks one or more favorite sports teams of the user of the electronic device, and the one or more sports teams tracked in the first application and the one or more sports teams tracked in the second application are synchronized.

14. The method of claim 1, wherein the first recommended content includes one or more representations of one or more sports teams, wherein input associated with the one or more representations of the one or more sports teams designates the corresponding sports teams as favorite sports teams in the first application.

15. The method of claim 14, wherein the first entity is a sports team and the user-defined set of entities is a set of one or more favorite sports teams.

16. The method of claim 1, wherein the first recommended content is recommended based on one or more sports teams that are recommended as favorite sports teams in the first application or the second application, independent or whether the one or more recommended sports teams are added as favorite sports teams.

17. The method of claim 1, wherein the first recommended content is recommended based on one or more sports teams that are designated as favorite sports teams, and not based on one or more sports teams that are recommended but not designated as favorite sports teams.

18. The method of claim 1, wherein the first recommended content is based on a location of the electronic device, one or more topics designated as of interest to a user of the electronic device, one or more indications related to one or more sources of content, or a combination of two or more thereof.

19. An electronic device, comprising:
one or more processors;
memory; and
one or more programs, wherein the one or more programs are stored in the memory and configured to be executed by the one or more processors, the one or more programs including instructions for:
receiving, via one or more input devices, a first input corresponding to a request to display a first user interface of a first application;
in response to receiving the first input, displaying, via a display generation component, the first user interface of the first application, including:
in accordance with a determination that input for interaction with first content in a second application, different from the first application, satisfies one or more first criteria, displaying, in the first user interface, first recommended content based on the first content; and
in accordance with a determination that the input for interaction with the first content in the second application does not satisfy the one or more first criteria, forgoing displaying, in the first user interface, the first recommended content;
while displaying the first recommended content, including a first representation of a first entity, receiving, via the one or more input devices, a second input corresponding to a request to designate the first entity as belonging to a user-defined set of entities; and
in response to receiving the second input, designating the first entity as belonging to the user-defined set of entities, and initiating a process to recommend additional recommended content based on the first entity.

20. A non-transitory computer readable storage medium storing one or more programs, the one or more programs comprising instructions, which when executed by one or more processors of an electronic device, cause the electronic device to perform a method comprising:
receiving, via one or more input devices, a first input corresponding to a request to display a first user interface of a first application;
in response to receiving the first input, displaying, via a display generation component, the first user interface of the first application, including:
in accordance with a determination that input for interaction with first content in a second application, different from the first application, satisfies one or more first criteria, displaying, in the first user interface, first recommended content based on the first content; and
in accordance with a determination that the input for interaction with the first content in the second application does not satisfy the one or more first criteria, forgoing displaying, in the first user interface, the first recommended content;
while displaying the first recommended content, including a first representation of a first entity, receiving, via the one or more input devices, a second input corresponding to a request to designate the first entity as belonging to a user-defined set of entities; and
in response to receiving the second input, designating the first entity as belonging to the user-defined set of entities, and initiating a process to recommend additional recommended content based on the first entity.

21. The electronic device of claim 19, wherein the first recommended content includes a representation of a sports team that is selectable to designate the sports team as a favorite sports team.

22. The electronic device of claim 19, wherein the first application is a video content browsing and playback application, and the first recommended content includes a representation of a video content item that is selectable to display the video content item.

23. The electronic device of claim 22, wherein the first recommended content is recommended based on a sports team that is identified as a favorite sports team in the first application or the second application.

24. The electronic device of claim 22, wherein the first recommended content is recommended based on text-based content consumed in the second application, wherein the text-based content consumed in the second application is related to one or more sports teams.

25. The electronic device of claim 22, wherein:
the first recommended content is a video content version of respective content; and
the first recommended content is recommended based on a text-based version of the respective content consumed in the second application.

26. The electronic device of claim 19, wherein the first application is a text-based content browsing and display application, and the first recommended content includes a representation of a text-based content item that is selectable to display the text-based content item.

27. The electronic device of claim 26, wherein the text-based content item is recommended based on a sports team that is identified as a favorite sports team in the first application or the second application.

28. The electronic device of claim 26, wherein the first recommended content is recommended based on video content consumed in the second application, wherein the video content consumed in the second application is related to one or more sports teams.

29. The electronic device of claim 26, wherein:
the first recommended content is a text content version of respective content; and
the first recommended content is recommended based on a video-based version of the respective content consumed in the second application.

30. The electronic device of claim 26, wherein:
the first recommended content is related to a person and recommended based on text-based content consumed in the second application, wherein the text-based content consumed in the second application is related to the person.

31. The electronic device of claim 26, wherein:
the first recommended content is related to a person and recommended based on video content consumed in the second application, wherein the video content consumed in the second application is related to the person.

32. The electronic device of claim 19, wherein the first application tracks one or more favorite sports teams of a user of the electronic device, the second application tracks one or more favorite sports teams of the user of the electronic device, and the one or more sports teams tracked in the first application and the one or more sports teams tracked in the second application are synchronized.

33. The electronic device of claim 19, wherein the first recommended content includes one or more representations of one or more sports teams, wherein input associated with the one or more representations of the one or more sports teams designates the corresponding sports teams as favorite sports teams in the first application.

34. The electronic device of claim 33, wherein the first entity is a sports team and the user-defined set of entities is a set of one or more favorite sports teams.

35. The electronic device of claim 19, wherein the first recommended content is recommended based on one or more sports teams that are recommended as favorite sports teams in the first application or the second application, independent or whether the one or more recommended sports teams are added as favorite sports teams.

36. The electronic device of claim 19, wherein the first recommended content is recommended based on one or more sports teams that are designated as favorite sports teams, and not based on one or more sports teams that are recommended but not designated as favorite sports teams.

37. The electronic device of claim 19, wherein the first recommended content is based on a location of the electronic device, one or more topics designated as of interest to a user of the electronic device, one or more indications related to one or more sources of content, or a combination of two or more thereof.

38. The non-transitory computer readable storage medium of claim 20, wherein the first recommended content includes a representation of a sports team that is selectable to designate the sports team as a favorite sports team.

39. The non-transitory computer readable storage medium of claim 20, wherein the first application is a video content browsing and playback application, and the first recommended content includes a representation of a video content item that is selectable to display the video content item.

40. The non-transitory computer readable storage medium of claim 39, wherein the first recommended content is recommended based on a sports team that is identified as a favorite sports team in the first application or the second application.

41. The non-transitory computer readable storage medium of claim 39, wherein the first recommended content is recommended based on text-based content consumed in the second application, wherein the text-based content consumed in the second application is related to one or more sports teams.

42. The non-transitory computer readable storage medium of claim 39, wherein:
the first recommended content is a video content version of respective content; and
the first recommended content is recommended based on a text-based version of the respective content consumed in the second application.

43. The non-transitory computer readable storage medium of claim 20, wherein the first application is a text-based content browsing and display application, and the first recommended content includes a representation of a text-based content item that is selectable to display the text-based content item.

44. The non-transitory computer readable storage medium of claim 43, wherein the text-based content item is recommended based on a sports team that is identified as a favorite sports team in the first application or the second application.

45. The non-transitory computer readable storage medium of claim 43, wherein the first recommended content is recommended based on video content consumed in the second application, wherein the video content consumed in the second application is related to one or more sports teams.

46. The non-transitory computer readable storage medium of claim 43, wherein:
the first recommended content is a text content version of respective content; and
the first recommended content is recommended based on a video-based version of the respective content consumed in the second application.

47. The non-transitory computer readable storage medium of claim 43, wherein:
the first recommended content is related to a person and recommended based on text-based content consumed in the second application, wherein the text-based content consumed in the second application is related to the person.

48. The non-transitory computer readable storage medium of claim 43, wherein:
the first recommended content is related to a person and recommended based on video content consumed in the second application, wherein the video content consumed in the second application is related to the person.

49. The non-transitory computer readable storage medium of claim 20, wherein the first application tracks one or more favorite sports teams of a user of the electronic device, the second application tracks one or more favorite sports teams of the user of the electronic device, and the one or more sports teams tracked in the first application and the one or more sports teams tracked in the second application are synchronized.

50. The non-transitory computer readable storage medium of claim 20, wherein the first recommended content includes one or more representations of one or more sports teams, wherein input associated with the one or more representations of the one or more sports teams designates the corresponding sports teams as favorite sports teams in the first application.

51. The non-transitory computer readable storage medium of claim 50, wherein the first entity is a sports team and the user-defined set of entities is a set of one or more favorite sports teams.

52. The non-transitory computer readable storage medium of claim 20, wherein the first recommended content is recommended based on one or more sports teams that are recommended as favorite sports teams in the first application or the second application, independent or whether the one or more recommended sports teams are added as favorite sports teams.

53. The non-transitory computer readable storage medium of claim 20, wherein the first recommended content is recommended based on one or more sports teams that are designated as favorite sports teams, and not based on one or more sports teams that are recommended but not designated as favorite sports teams.

54. The non-transitory computer readable storage medium of claim 20, wherein the first recommended content is based on a location of the electronic device, one or more topics designated as of interest to a user of the electronic device, one or more indications related to one or more sources of content, or a combination of two or more thereof.

* * * * *